(12) United States Patent (10) Patent No.: US 7,969,431 B2
Makowski et al. (45) Date of Patent: *Jun. 28, 2011

(54) GRAPHICAL PROGRAM NODE FOR GENERATING A MEASUREMENT PROGRAM

(75) Inventors: Thomas A. Makowski, Austin, TX (US); Geoffrey Schmit, Naperville, IL (US)

(73) Assignee: National Instruments Corporation, Austin, TX (US)

( * ) Notice: Subject to any disclaimer, the term of this patent is extended or adjusted under 35 U.S.C. 154(b) by 970 days.

This patent is subject to a terminal disclaimer.

(21) Appl. No.: 10/194,476

(22) Filed: Jul. 12, 2002

(65) Prior Publication Data

US 2003/0018446 A1 Jan. 23, 2003

Related U.S. Application Data

(63) Continuation-in-part of application No. 10/008,792, filed on Nov. 13, 2001, now Pat. No. 6,879,926.

(60) Provisional application No. 60/301,785, filed on Jun. 29, 2001.

(51) Int. Cl.
*G06T 15/00* (2006.01)
(52) U.S. Cl. .............................. 345/418; 710/8; 715/735
(58) Field of Classification Search .................. 345/418; 710/8; 709/220; 715/735; 718/100
See application file for complete search history.

(56) References Cited

U.S. PATENT DOCUMENTS

| | | | |
|---|---|---|---|
| 4,812,996 A | 3/1989 | Stubbs | |
| 4,868,785 A | 9/1989 | Jordan et al. | |
| 4,884,228 A | 11/1989 | Stanley et al. | |
| 5,133,045 A | 7/1992 | Gaither et al. | |
| 5,136,705 A | 8/1992 | Stubbs et al. | |
| 5,155,836 A | 10/1992 | Jordan et al. | |
| 5,481,741 A | 1/1996 | McKaskle et al. | |
| 5,630,164 A | 5/1997 | Williams et al. | |
| 5,812,394 A | 9/1998 | Lewis et al. | |
| 5,815,715 A * | 9/1998 | Kuçukçakar | 717/141 |
| 5,926,775 A | 7/1999 | Brumley et al. | |
| 5,991,537 A | 11/1999 | McKeon et al. | |
| 6,067,584 A | 5/2000 | Hayles et al. | |

(Continued)

OTHER PUBLICATIONS

Konstantinides et al., The Khoros Software Development Environment for Image and Signal Processing, University of New Mexico, 1994, pp. 1-14.*

(Continued)

*Primary Examiner* — Phu Nguyen
(74) *Attorney, Agent, or Firm* — Meyertons Hood Kivlin Kowert & Goetzel, P.C.; Jeffrey C. Hood; Mark S. Williams

(57) ABSTRACT

A system and method for performing a measurement task. A node is displayed in a graphical program, and configured to receive a measurement task specification (MTS). The node may be coupled to an MTS node, or to a configuration node which constructs the MTS at run time. When the program executes, the node receives the MTS, invokes an expert system to analyze the MTS, optionally validate the MTS, generates a run-time specification for the task. The node them invokes a run-time builder to analyze the run-time specification and generate a run-time based on the run-time specification, where the run-time is executable to perform the measurement task. The node may be a read node, a write node, or a start node connected to a read or write node. Additional operations may be performed prior to or during the first iteration, and/or during or after the last iteration, of the task.

37 Claims, 31 Drawing Sheets

U.S. PATENT DOCUMENTS

| | | | |
|---|---|---|---|
| 6,096,094 | A | 8/2000 | Kay et al. |
| 6,098,028 | A | 8/2000 | Zwan et al. |
| 6,173,438 | B1 | 1/2001 | Kodosky et al. |
| 6,219,628 | B1 | 4/2001 | Kodosky et al. |
| 6,944,606 | B2 * | 9/2005 | Schmit et al. .......... 706/60 |
| 7,493,512 | B2 * | 2/2009 | Apelbaum et al. ........ 714/2 |
| 7,630,854 | B2 * | 12/2009 | Sierer et al. .......... 702/127 |

OTHER PUBLICATIONS

Yen et al, A Task=Based Methodology for Specifying Expert System, Proceedings of the IEEE International Conference on Tools for Artificial Intelligence, Feb. 1993, pp. 8-15.*

National Instruments "The Measurement and Automation Catalog 2001", Copyright 2000, pp. 252-255.

* cited by examiner

High-Level Architecture

GRAPHICAL PROGRAM NODE FOR GENERATING A MEASUREMENT PROGRAM

CONTINUATION DATA

This application is a Continuation-in-Part of U.S. utility application Ser. No. 10/008,792 titled "Measurement System Software Architecture for Easily Creating High-Performance Measurement Applications" filed Nov. 13, 2001, now U.S. Pat. No. 6,879,926 whose inventors are Geoffrey Schmit, Brent Schwan, Jonathan Brumley, Thomas A. Makowski, and Christopher T. Bartz, which claims benefit of priority of U.S. provisional application Ser. No. 60/301,785 titled "Measurement System Software Architecture for Easily Creating High-Performance Measurement Applications" filed Jun. 29, 2001, whose inventors are Geoffrey Schmit, Brent Schwan, Jonathan Brumley, Thomas A. Makowski, and Christopher T. Bartz.

BACKGROUND OF THE INVENTION

1. Field of the Invention

The present invention relates generally to the field of measurement and automation systems. More particularly, the present invention relates to a node in a graphical program which is useable to generate an executable program for performing a measurement task.

2. Description of the Related Art

Scientists and engineers often use measurement or automation systems to perform a variety of functions, including measurement of a physical phenomenon or unit under test (UUT), test and analysis of physical phenomena, simulation, hardware-in-the-loop testing, process monitoring and control, control of mechanical or electrical machinery, data logging, laboratory research, and analytical chemistry, to name a few examples.

A typical measurement system includes a computer system with a measurement device or measurement hardware. The measurement device may be or include a computer-based instrument, a data acquisition device or board, a programmable logic device (PLD), a sensor, a smart sensor, an actuator, a signal generator, or other type of device for acquiring or generating data. The measurement device may be a card or board plugged into one of the I/O slots of the computer system, a card or board plugged into a chassis, or an external device. For example, in a common measurement system configuration, the measurement hardware is coupled to the computer system via other means such as through a VXI (VME eXtensions for Instrumentation) bus, a PXI (PCI eXtensions for Instrumentation) bus, a GPIB (General Purpose Interface Bus), a serial port, or a parallel port of the computer system. Optionally, the measurement system includes signal conditioning devices which receive the field signals and condition the signals to be acquired.

A measurement system may also typically include transducers, sensors, actuators or other detecting (or generating) means for providing "field" electrical signals representing a process, physical phenomena, equipment being monitored or measured, etc. The field signals are provided to the measurement hardware.

The measurement hardware is configured and controlled by measurement software executing on the computer system. The measurement software for configuring and controlling the measurement system typically comprises two portions: the device interface or driver-level software and the application software, or the application. The driver-level software serves to interface the measurement hardware to the application. The driver-level software may be supplied by the manufacturer of the measurement hardware or by some other third party software vendor. An example of measurement or DAQ driver-level software is NI-DAQ from National Instruments Corporation. The application or client is typically developed by the user of the measurement system and is tailored to the particular function which the user intends the measurement system to perform. The measurement hardware manufacturer or third party software vendor sometimes supplies the application software for certain applications which are common, generic or straightforward.

One drawback of some current measurement system architectures is that complex measurement tasks involving multiple devices require that each device be programmed separately, and that synchronization signals be explicitly routed. Users must typically specify and configure measurement tasks at an advanced level, which is time consuming, expensive, and prone to error. For example, in some prior art systems, users must specify numerous parameter values for channels, timing, and triggering for a measurement task. Typically there is no mechanism for providing default values for the parameters, so that the user must not only know all of the parameters which are needed to specify the task, but must also know what values of the parameters are appropriate for the task. These issues may become more important when multiple devices are utilized to perform the task, in that the number and variety of parameters may increase accordingly.

Additionally, many current measurement systems require that the user perform a significant amount of programming, either in a text-based programming language such as LabWindows or Visual Basic, or in a graphical programming language such as LabVIEW. It would be desirable for a user to be able to more easily create measurement solutions with reduced programming requirements.

Therefore, it would be desirable to provide new systems and methods for specifying and performing measurement tasks.

SUMMARY OF THE INVENTION

A system and method are presented for creating a graphical program that performs a task, such as a measurement task. In one embodiment, the method includes displaying a node in a graphical program, configuring the node to receive a measurement task specification, and executing the graphical program. The node may be a primitive node provided by a graphical programming development environment for inclusion in the graphical program. Configuring the node to receive the measurement task specification may include connecting an input terminal of the node to an output terminal of another node in the graphical program. In one embodiment, the other node is a measurement task specification node which represents a generated measurement task specification characterizing or specifying a desired measurement task. In another embodiment, the other node may be a configuration node which operates to configure a measurement task specification for input to the node. The configuration node may operate in conjunction with zero or more other configuration nodes to generate the measurement task specification during execution of the graphical program. In other words, one or more configuration nodes may incrementally add configuration information to the measurement task specification, thereby building a complete measurement task specification for input to the node.

The measurement task may include one or more measurements and/or one or more signal generations. When the measurement task includes a measurement, the node may be a read node. When the measurement task includes a signal generation, the node may be a write node. In one embodiment, the node may be a start node, also referred to as a play node, which is operable to be connected to a read node for performing a measurement, or a write node for performing a signal generation. The GUI may also display a stop node in the graphical program, where the stop node is also connected to the read or write node. The stop node may be operable to terminate the measurement task, i.e., the measurement (read) or signal generation (write).

In executing the graphical program, the node may receive the measurement task specification as input. The node may then invoke an expert system to analyze the measurement task specification and generate a run-time specification for the measurement task in response to the analyzing. In one embodiment, the expert system may validate the measurement task specification prior to generating the run-time specification. The node may then invoke a run-time builder to analyze the run-time specification and generate a run-time based on the run-time specification, where the run-time may be executable to perform the measurement task. Finally, the node may invoke execution of the run-time to perform the measurement task. In one embodiment, the run-time builder may configure one or more measurement devices according to the run-time specification, where the run-time executes to perform the measurement task using the configured one or more measurement devices.

In one embodiment, a measurement task specifier may be used to generate the measurement task specification. For example, the measurement task specifier may display a graphical user interface (GUI) for specifying the measurement task. The GUI may receive user input indicating values for a plurality of parameters characterizing the measurement task, where the values for the plurality of parameters are useable in generating the measurement task specification. The measurement task specifier may then generate the measurement task specification based on the indicated parameter values. In one embodiment, the measurement task specification may include configuration information for one or more measurement devices, where, after being configured with the configuration information, the one or more measurement devices may be operable to perform the measurement task.

In one embodiment, the task may be a repetitive task, where the node may invoke two or more iteration cycles of the program to perform the task. In some applications there may be special conditions related to the initial iteration cycle of the repetitive task. In this case, the node may be further operable to perform one or more operations prior to or during a first iteration cycle of the program. For example, certain variables, data structures, programs, or devices may need to be initialized before the task is performed. To accommodate these special conditions, the node may perform one or more operations prior to or during a first iteration cycle of the program. In yet another embodiment, the node may perform one or more operations during the first n iteration cycles of the program, where the value of n may be specified by the user. For example, in an application where the task involves computing a moving average of sample values, the moving average window may be n data points long, and thus may not be "filled" until n iteration cycles have been performed. The node may be operable to perform special operations to accommodate this condition for the first n iteration cycles of the program.

As mentioned above, the graphical program may also include a stop node which operates to terminate the repetitive task. In other words, the stop node may operate to terminate the specified task, e.g., data acquisition by the measurement device, upon fulfillment of stopping conditions. In another embodiment, where the node includes implied looping functionality, the node itself may function as the stop node. Where the node invokes two or more iteration cycles of the program to perform the task, the node may be further operable to perform one or more operations during or after a final iteration cycle of the program. For example, certain "clean-up" operations may need to be performed just before or during task termination, such as de-allocation of memory for data structures used in performing the task, among others. For another example, in the application described above where the task involves computing a moving average of sample values, it may be the case that whereas the averaging algorithm operates on 20 data points or samples at a time, in the last cycle there may only, say, six data points available. Thus, a boundary condition for the algorithm may exist which must be accommodated for the algorithm to complete successfully. Therefore, in another embodiment, the node may be operable to perform one or more operations during or after a final iteration cycle of the program.

When the task is a repetitive task, the node may include an implied processing loop, i.e., "while loop" or "for loop" functionality may be incorporated in the node. Thus, a read node or write node may operate to perform looping functionality to perform iterative tasks. In one embodiment, configuring the node to perform the repetitive task may include displaying a different node or icon, e.g., a looping configuration node, in the graphical program which represents a repetitive task parameter, and connecting the node to the different node to indicate that the node is to execute repetitively in accordance with the repetitive task parameter. Said another way, rather than displaying the node in a loop structure in the graphical program, the node may be connected to another node in the graphical program which specifies looping functionality. The node may then be operable to perform iterative tasks. In one embodiment, the node may receive looping specifications from the different node, but implement the looping functionality itself. In another embodiment, the different node, e.g., the looping configuration node, may execute to perform the looping functionality for the iterative task.

In one embodiment, the graphical program may be generated programmatically. The programmatically generated program may be a graphical program, such as a LabVIEW graphical program, or a text-based program, e.g., a C program. For example, the GUI may receive user input indicating or requesting programmatic generation of the graphical program, and the graphical program may then be generated programmatically in response to the user input. The measurement task specifier may then generate the program based on the parameter values specified for the measurement task. In another embodiment, the measurement task specifier may generate the program based on the measurement task specification. If the program is a graphical program, the GUI may display a block diagram of the generated program, for example, in a program panel.

In one embodiment, the graphical program, e.g., the node, may be operable to receive user input selecting the node, and to display a more detailed graphical program representing operations of the node. For example, where the node includes looping operations as described above, double-clicking on the node may result in displaying a loop structure in the graphical program, e.g., around the node.

BRIEF DESCRIPTION OF THE DRAWINGS

A better understanding of the present invention may be obtained when the following detailed description of the preferred embodiment is considered in conjunction with the following drawings, in which.

Figure 1:
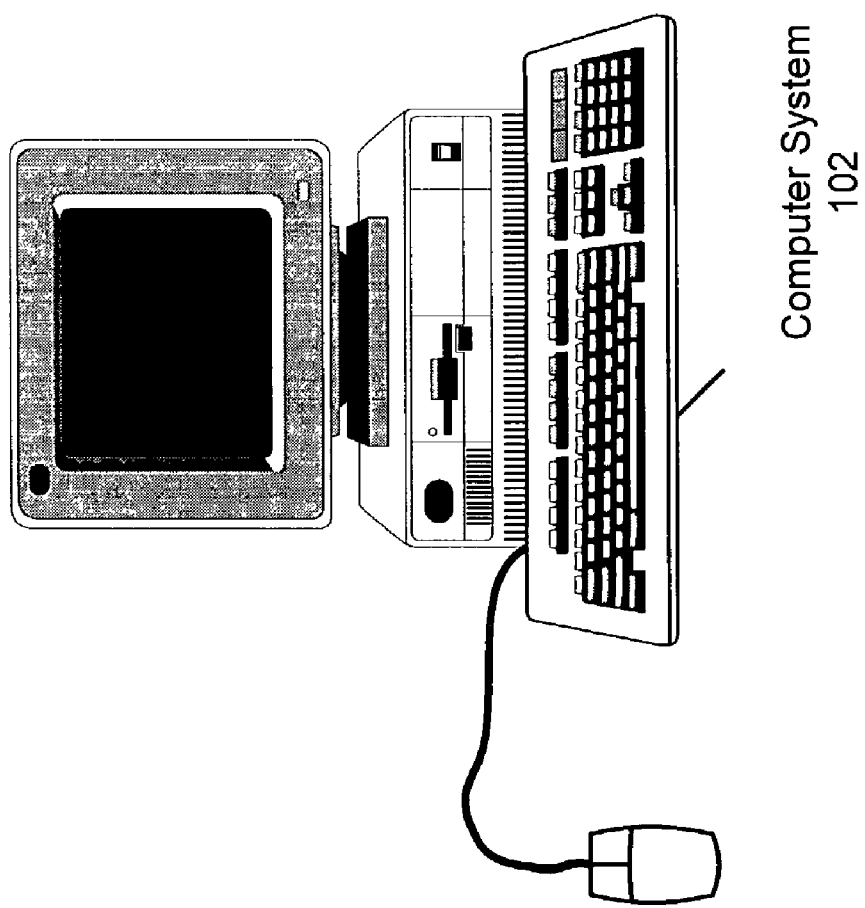
FIG. 1 illustrates an exemplary computer system suitable for implementing various embodiments of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

Incorporation by Reference

U.S. application Ser. No. 10/128,843 titled "Measurement System Graphical User Interface for Easily Creating Measurement Applications" filed Apr. 24, 2002, and whose inventors are Brian Johnson, John Breyer, and Joe Savage, is hereby incorporated by reference as though fully and completely set forth herein.

U.S. application Ser. No. 10/008,792 titled "Measurement System Software Architecture for Easily Creating High-Performance Measurement Applications" filed Nov. 13, 2001, and whose inventors are Geoffrey Schmit, Brent Schwan, Jonathan Brumley, Thomas A. Makowski, and Christopher T. Bartz, is hereby incorporated by reference as though fully and completely set forth herein.

U.S. patent application Ser. No. 10/010,829 titled "Measurements Expert System and Method For Generating High-Performance Measurements Software Drivers" filed Nov. 13, 2001, and whose inventors are Geoffrey Schmit, Jonathan Brumley, Brent Schwan and Jack Levy, is hereby incorporated by reference as though fully and completely set forth herein.

U.S. patent application Ser. No. 10/010,826 titled "A System of Measurements Experts and Method for Generating High-Performance Measurements Software Drivers" filed Nov. 13, 2001, and whose inventors are Geoffrey Schmit, Jonathan Brumley, Brent Schwan and Jack Levy, is hereby incorporated by reference as though fully and completely set forth herein.

U.S. Provisional Application Ser. No. 60/301,785 titled "Measurement System Software Architecture for Easily Creating High-Performance Measurement Applications" filed Jun. 29, 2001, and whose inventors are Geoffrey Schmit, Brent Schwan, Jonathan Brumley, Thomas A. Makowski, and Christopher T. Bartz, is hereby incorporated by reference as though fully and completely set forth herein.

FIG. 1—Computer System

FIG. 1 illustrates a computer system 102 operable to execute various embodiments of the present invention. The computer system 102 may be any type of computer system, including a personal computer system, mainframe computer system, workstation, network appliance, Internet appliance, personal digital assistant (PDA), television system or other device. In general, the term "computer system" may be broadly defined to encompass any device having at least one processor that executes instructions from a memory medium.

As shown in FIG. 1, the computer system 102 may include a display device operable to display operations associated with the methods described herein. For example, the display device may be operable to display a graphical user interface which allows a user to specify or describe a measurement task. The graphical user interface may comprise any type of graphical user interface, e.g., depending on the computing platform. As shown, the computer system 102 may include one or more input devices, such as a keyboard, mouse, etc. The computer system 102 may include one or more processors, e.g., CPUs and/or programmable hardware elements, which may be operable to execute program instructions according to various embodiments of the present invention.

The computer system 102 may include a memory medium(s) on which one or more computer programs or software components according to one embodiment of the present invention may be stored. For example, the memory medium may store one or more software programs which are executable to perform the methods described herein. Also, the memory medium may store a programming development environment application used to create and/or execute measurement software programs. The memory medium may also store operating system software, as well as other software for operation of the computer system.

The term "memory medium" is intended to include various types of memory or storage, including an installation medium, e.g., a CD-ROM, floppy disks, or tape device; a computer system memory or random access memory such as DRAM, SRAM, EDO RAM, Rambus RAM, etc.; or a nonvolatile memory such as a magnetic media, e.g., a hard drive, or optical storage. The memory medium may comprise other types of memory or storage as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution.

In addition, the memory medium may be located in a first computer, e.g., computer system 102, or may be located in a second different computer which connects to the first computer over a network, such as the Internet, as described below with reference to FIG. 2. In the latter instance, the second computer may provide program instructions to the first computer for execution.

Figure 2:
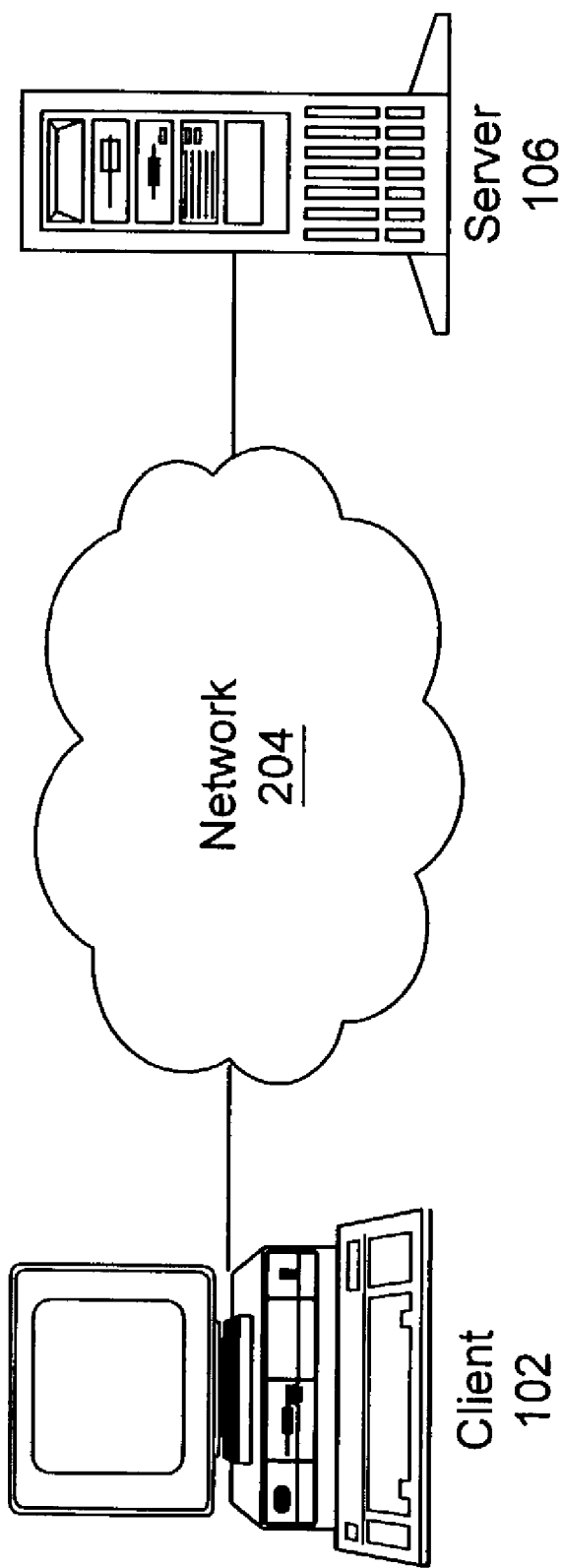
FIG. 2 illustrates the computer system of FIG. 1 coupled to a server across a network, according to one embodiment.

FIG. 2—A Network System

FIG. 2 illustrates a simplified and exemplary network system that operates according to various embodiments of the present invention. In the system shown in FIG. 2 the computer system 102 of FIG. 1 is coupled to a second computer 106, such as a server computer system 106, over a network 204, such as the Internet, or a computer bus. Thus, FIG. 2 illustrates an exemplary distributed system which may be suitable for implementing the methods described herein. The computer systems 102 and 106 may each be any of various types as desired, as described above. Also, the network 204 can also be any of various types, including a LAN (local area network), WAN (wide area network), the Internet, or an Intranet, among others. The transmission medium coupling the systems may include any wired or wireless media, as are well known in the art. Thus, in one embodiment, the host computer 102 and the server computer 106 may comprise a distributed system.

As used herein, the term "distributed system" is intended to include a system comprising two or more interconnected or coupled devices, i.e., two or more devices that are coupled together in some fashion. The two or more devices may be coupled together via wired or wireless means. Wired means may include a network, such as a local area network (LAN) and/or a wide area network (WAN), such as the Internet, a computer bus, a serial or parallel bus, or other wired communication methods. Example local area networks include Ethernet networks, Token Ring networks, and various industrial communication networks such as fieldbus, DeviceNet, and CAN (Controller Area Network) networks. Example parallel buses include the PCI bus, PXI bus, GPIB, and VXI bus, among others. Example serial buses include USB (Universal Serial Bus), IEEE 1394, RS-242, and RS-485, among others. Wireless means may include wireless protocols such as IEEE 802.11 (wireless Ethernet), Bluetooth, and other types of wireless communication.

In one embodiment, the server 106 may store programs, applications, or data which may be accessed or retrieved by the host computer system 102. Thus, the server 103 may store measurement task specification software or information, for example, in a database or library. The computer system 102 may access the server 106 to retrieve data or execute software to implement various embodiments of the system and method described herein.

Figure 3A:
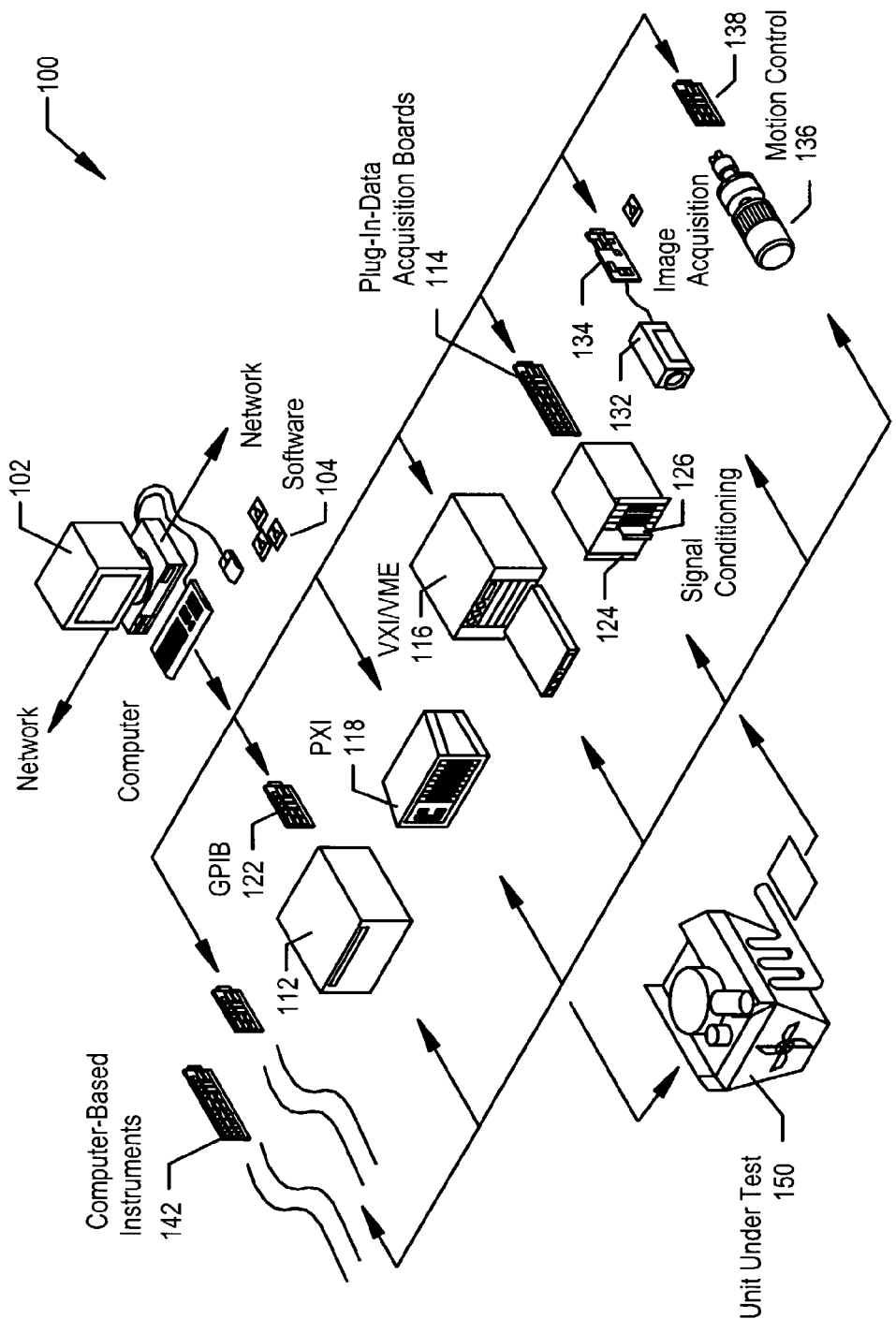
FIGS. 3A and 3B illustrate representative instrumentation and process control systems, including various I/O interface options.
Figure 3B:
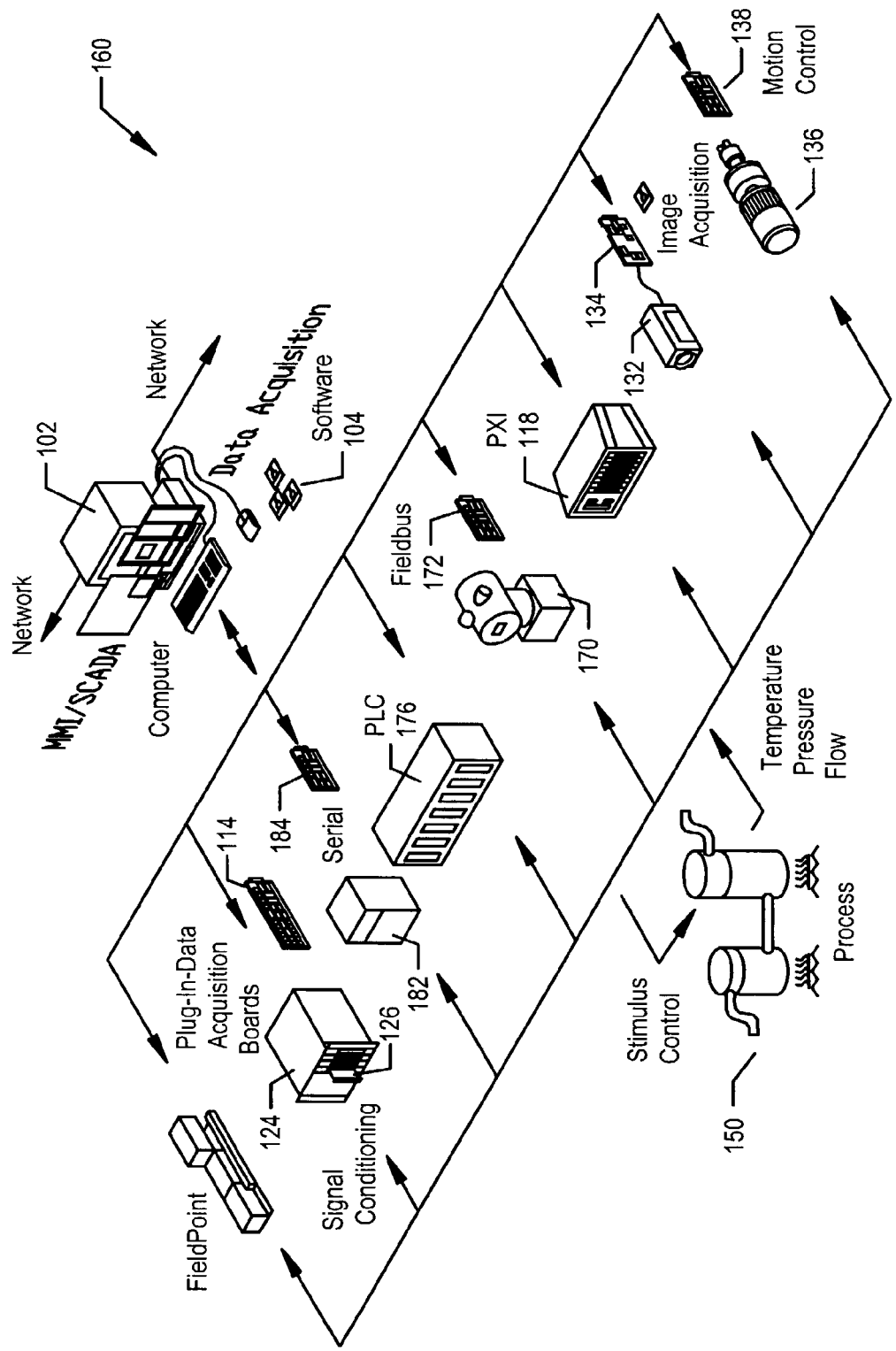

FIGS. 3A and 3B—Instrumentation and Industrial Automation Systems

FIGS. 3A and 3B illustrate exemplary measurement and automation systems. As used herein, the term "measurement system" is intended to include the types of measurement systems and automation systems shown in FIGS. 3A and 3B, as well as other types of systems. The measurement system shown in FIGS. 3A and 3B may include software programs according to one embodiment of the present invention. These programs may of course be stored in or used by other types of systems as desired. In accordance with one embodiment of the present invention, the present system and method includes a novel software architecture and novel software programs for allowing users to more easily create measurement and automation tasks (collectively referred to as "measurement tasks"), verify functionality, and easily create application code to implement desired tasks.

As used herein, the term "measurement system" is intended to include an instrumentation system such as that shown in FIG. 3A, an industrial automation system such as that shown in FIG. 3B, or a modeling or simulation system involved with the design, validation or testing of a product involving "real world I/O", i.e., the acquisition or generation of data to/from a model or simulation of a device or product being designed, validated or tested, such as hardware-in-the loop validation. The term "measurement" may include instrumentation measurement, data acquisitions, automation, control, and simulation.

FIG. 3A illustrates an exemplary instrumentation control system 100. The system 100 may comprise a host computer 102 which connects to one or more devices or instruments. The host computer 102 may comprise a CPU, a display, memory, and one or more input devices such as a mouse or keyboard, as shown. The host computer 102 connects through the one or more instruments to analyze, measure, or control a unit under test (UUT) or process 150.

The host computer 102 may execute a program which interacts with or controls the one or more instruments. The one or more instruments may include a GPIB instrument 112 and associated GPIB interface card 122, a data acquisition board 114 and associated signal conditioning circuitry 124, a VXI instrument 116, a PXI instrument 118, a video device or camera 132 and associated image acquisition card 134, a motion control device 136 and associated motion control interface card 138, and/or one or more computer based instrument cards 142, among other types of devices. Note that the computer based instrument card 142 may be a board or card with one or more FPGAs, one or more CPUs and memory, or various combinations of the two.

The GPIB instrument 112 may be coupled to the computer 102 via the GPIB interface card 122 provided by the computer 102. In a similar manner, the video device 132 may be coupled to the computer 102 via the image acquisition card 134, and the motion control device 136 may be coupled to the computer 102 through the motion control interface card 138. The data acquisition board 114 may be coupled to the computer 102, and may interface through signal conditioning circuitry 124 to the UUT. The signal conditioning circuitry 124 may comprise an SCXI (Signal Conditioning extensions for Instrumentation) chassis comprising one or more SCXI modules 126.

The GPIB card 122, the image acquisition card 134, the motion control interface card 138, and the DAQ card 114 are typically plugged in to an I/O slot in the computer 102, such as a PCI bus slot, a PC Card slot, or an ISA, EISA or Micro-Channel bus slot provided by the computer 102. However, these cards 122, 134, 138 and 114 are shown external to computer 102 for illustrative purposes. These cards 122, 134, 138, 114 may also connected to the computer 102 through a USB (Universal Serial Bus), IEEE 1394 or 1394.2 bus provided by the computer 102.

The VXI chassis or instrument 116 may be coupled to the computer 102 via a VXI bus, MXI bus, or other serial or parallel bus provided by the computer 102. The computer 102 may include VXI interface logic, such as a VXI, MXI or GPIB interface card (not shown), which interfaces to the VXI chassis 116. The PXI instrument may be coupled to the computer 102 through the computer's PXI bus. The PXI chassis may be coupled to the computer 102 via a MXI-3 bus.

A serial instrument (not shown) may also be coupled to the computer 102 through a serial port, such as an RS-232 port, USB (Universal Serial bus) or IEEE 1394 or 1394.2 bus, provided by the computer 102.

In typical instrumentation control systems an instrument of each interface type may not be present, and in fact many systems may only have one or more instruments of a single interface type, such as only GPIB instruments. The instruments are coupled to the unit under test (UUT) or process 150, or are coupled to receive field signals, typically generated by transducers. The system 100 may be used in a data acquisition and control application, in a test and measurement application, a process control application, a man-machine interface application, or a simulation application.

FIG. 3B illustrates an exemplary industrial automation system 160. The industrial automation system 160 may be similar to the instrumentation or test and measurement system 100 shown in FIG. 3A. Elements which are similar or identical to elements in FIG. 3A have the same reference numerals for convenience. The system 160 comprises a computer 102 which connects to one or more devices or instruments. The computer 102 comprises a CPU, a display screen, memory, and one or more input devices such as a mouse or keyboard as shown. The computer 102 connects through the one or more devices to a process or device 150 to perform an automation function, such as NMI (Man Machine Interface), SCADA (Supervisory Control and Data Acquisition), portable or distributed data acquisition, process control, advanced analysis, or other control. In FIG. 3B, the computer 102 may execute a program that is involved with the automation function performed by the automation system 160.

The one or more devices may include a data acquisition board 114 and associated signal conditioning circuitry 124, a PXI instrument 118, a video device 132 and associated image acquisition card 134, a motion control device 136 and associated motion control interface card 138, a FieldBus device 170 and associated FieldBus interface card 172, a PLC (Programmable Logic Controller) 176, a serial instrument 182 and associated serial interface card 184, or a distributed data acquisition system, such as the FieldPoint system available from National Instruments, among other types of devices.

The DAQ card 114, the PXI chassis 118, the video device 132 and image acquisition card 134, and the motion control device 136 and motion control interface card 138 may be coupled to the computer 102 as described above. The serial instrument 182 may be coupled to the computer 102 through a serial interface card 184, or through a serial port, such as an RS-232 port, provided by the computer 102. The PLC 176 may couple to the computer 102 through a serial port, Ethernet port, or a proprietary interface. The FieldBus interface card 172 may be comprised in the computer 102 and interfaces through a FieldBus network to one or more FieldBus devices. Each of the DAQ card 114, the serial card 184, the FieldBus card 172, the image acquisition card 134, and the motion control card 138 are typically plugged in to an I/O slot in the computer 102 as described above. However, these cards 114, 184, 172, 134, and 138 are shown external to computer 102 for illustrative purposes. In typical industrial automation systems a device will not be present of each interface type, and in fact many systems may only have one or more devices of a single interface type, such as only PLCs. The devices are coupled to the device or process 150.

Referring again to FIGS. 3A and 3B, the computer system 102 and/or one or more of the instruments or devices may include a memory medium (or memory mediums) on which software according to the present invention may be stored. The memory medium may store a measurement task specifier, and optionally, an expert system, a plurality of experts, a run-time builder, and/or a plurality of measurement primitives. Additionally, the memory medium(s) may store various products produced by or with these software components, such as a measurement task specification, a run-time specification, and/or a run-time, all of which are described in more detail below. The memory medium(s) may also store configuration information for one or more of the above software programs.

In one embodiment, the software programs and software architecture as described herein may be designed for measurement systems, including data acquisition/generation, analysis, and/or display; automation systems; simulation systems; systems for controlling, modeling, or simulating instrumentation or industrial automation hardware; and systems for controlling, modeling or simulating systems or devices being designed, prototyped, validated or tested. However, it is noted that the present invention can be used for a plethora of applications and is not limited to instrumentation or industrial automation applications. In other words, FIGS. 3A and 3B are exemplary only, and the software programs and software architecture may be used for any of various purposes and may be stored in and execute on any of various types of systems to perform any of various applications.

Figure 4:
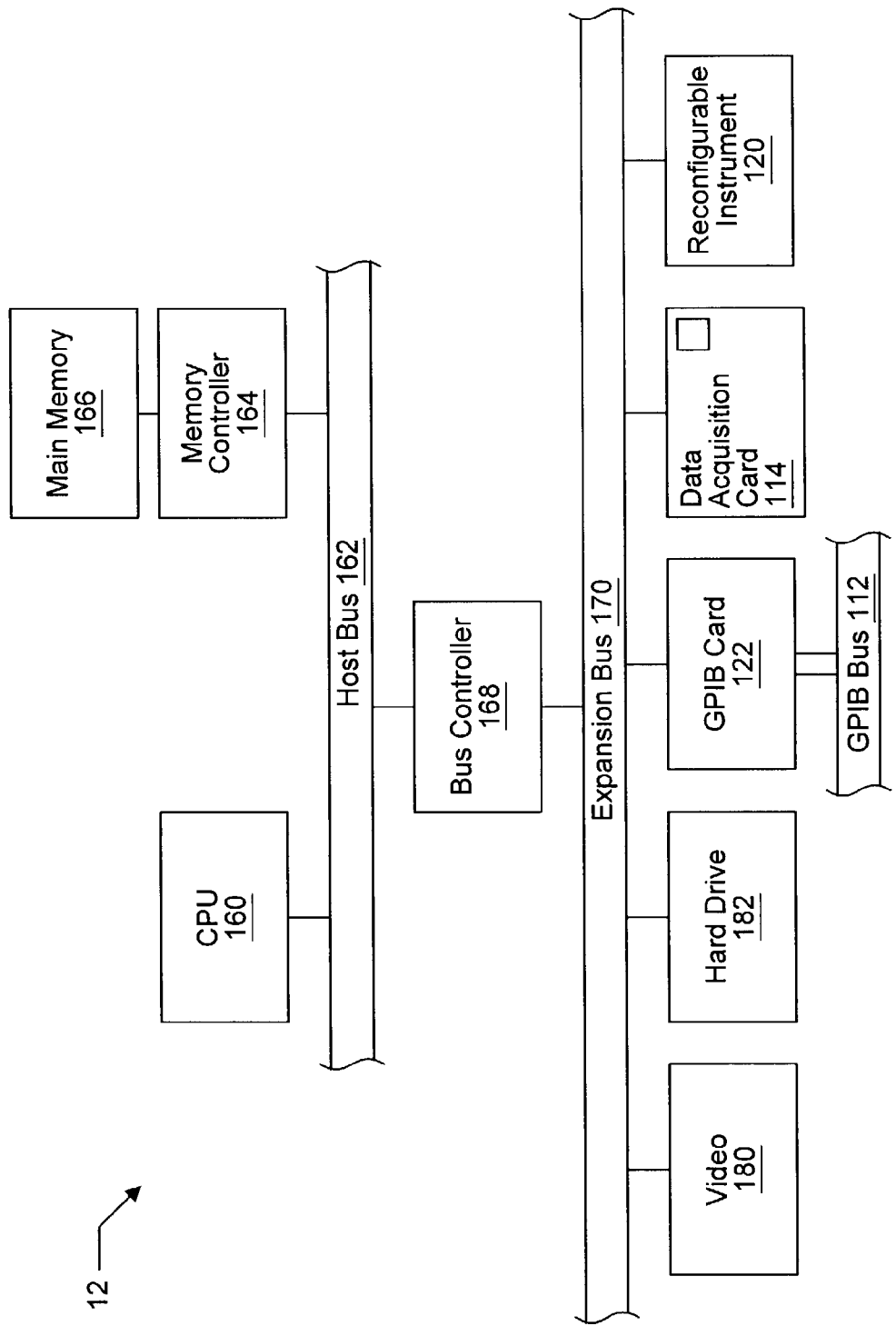
FIG. 4 is a block diagram of the computer system of FIGS. 1, 2, 3A and 3B.

FIG. 4—Computer System Block Diagram

FIG. 4 is an exemplary block diagram of the computer system illustrated in FIGS. 3A and 3B. It is noted that any type of computer system configuration or architecture can be used in conjunction with the system and method described herein, as desired, and FIG. 4 illustrates a representative PC embodiment. It is also noted that the computer system may be a general purpose computer system such as illustrated in FIGS. 3A and 3B, a computer implemented on a VXI card installed in a VXI chassis, a computer implemented on a PXI card installed in a PXI chassis, or other types of embodiments. The elements of a computer not necessary to understand the present invention have been omitted for simplicity.

The computer 102 includes at least one central processing unit or CPU 160 which is coupled to a processor or host bus 162. The CPU 160 may be any of various types, including a x86 processor, e.g., a Pentium class; a PowerPC processor; a CPU from the SPARC family of RISC processors; as well as others. Main memory 166 is coupled to the host bus 162 by means of memory controller 164. The main memory 166 may store one or more computer programs or libraries according to one embodiment of the present invention. The main memory 166 also stores operating system software as well as the software for operation of the computer system, as well known to those skilled in the art.

The host bus 162 is coupled to an expansion or input/output bus 170 by means of a bus controller 168 or bus bridge logic. The expansion bus 170 is preferably the PCI (Peripheral Component Interconnect) expansion bus, although other bus types can be used. The expansion bus 170 includes slots for various devices such as the data acquisition board 114 (of FIG. 3A), a GPIB interface card 122 which provides a GPIB bus interface to the GPIB instrument 112 (of FIG. 3A), and a reconfigurable instrument 120. Note that as used herein, the term "reconfigurable instrument" refers to an instrument with one or more of:

1) a processor and memory which is capable of being configured by a user or software program; and/or 2) reconfigurable logic, such as an FPGA (Field Programmable Gate Array).

For more information on a reconfigurable instrument which includes an embedded processor and embedded memory, please see U.S. Pat. No. 6,173,438 which is hereby incorporated by reference in its entirety as though fully and completely set forth herein. For more information on a reconfigurable instrument which includes reconfigurable hardware, e.g., an FPGA, please see U.S. Pat. No. 6,219,628 which is hereby incorporated by reference in its entirety as though fully and completely set forth herein. The computer 102 may further comprise a video display subsystem 180 and hard drive 182 coupled to the expansion bus 170.

Figure 5:
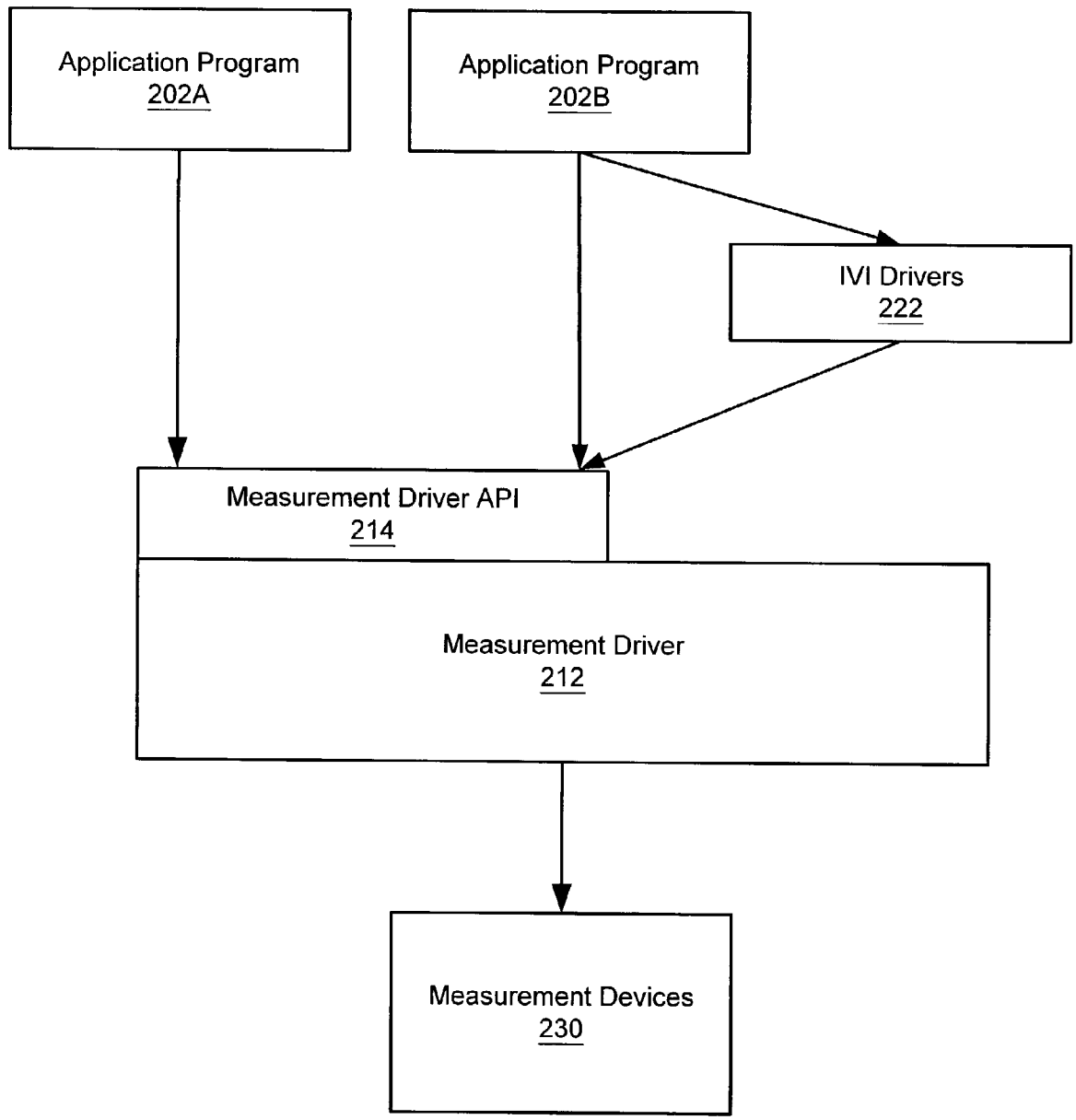
FIG. 5 illustrates one embodiment of a software architecture of a measurement system.

FIG. 5—Creating a Measurement Solution

FIG. 5 illustrates one embodiment of a software architecture for a system such as a measurement system. As shown, the system may include one or more application programs 202. The application programs are typically developed by a user to accomplish a certain task or achieve a certain result. Thus, the application program is typically a user created or developed program to solve a desired problem or accomplish a desired result for the user. It is noted that in addition to user-developed applications, programmatically generated application programs are also contemplated. The application program 202 may be developed in any of various development environments. For example, the application program may be an application developed in the LabVIEW graphical programming environment of National Instruments Corporation. The application program 202 may also be developed in other applications, such as National Instruments Measurement Studio, Visual Basic, Visual C++, Delphi, or other programming development environments. Thus, the application program may be developed in graphical programming environments such as LabVIEW, or a text-based programming environment such as Measurement Studio or Visual Basic. The application program 202 may thus comprise the customer's entire measurement system, and may include many more features and functions in addition to managing the particular measurement task specification and run-time generation, such as data analysis, report generation, or other higher-level functions of the measurement system.

As shown, the application 202 communicates with a measurement driver 212. The measurement driver 212 may include a measurement driver application programming interface (API) 214. As shown, the application program 202A or 202B interfaces with the measurement driver API 214 in order to access capabilities of the measurement driver 212. In this measurement example, the software architecture may also include interchangeable virtual instrument (IVI) drivers 222 wherein the application program 202B may interface through IVI drivers 222, which interface with the measurement driver API 214, to interface with the measurement driver 212.

The measurement driver 212 interfaces to the one or more various measurement devices 230 comprised in this system. The measurement devices 230 may comprise any of the various devices discussed above with respect to FIG. 5A or 3B and may comprise other devices not shown in FIGS. 3A and 3B as desired. In one embodiment, at least one of the one or more measurement devices comprises a hardware measurement device. In another embodiment, at least one of the one or more measurement devices comprises a virtual measurement device.

In one embodiment, the present invention provides an improved system and method for creating application programs, such as application programs 202A and 202B. The measurement driver 212 preferably includes various software that may allow creation of an application program 202A or 202B using a high-level interface and requiring reduced user effort and coding.

Figure 6:
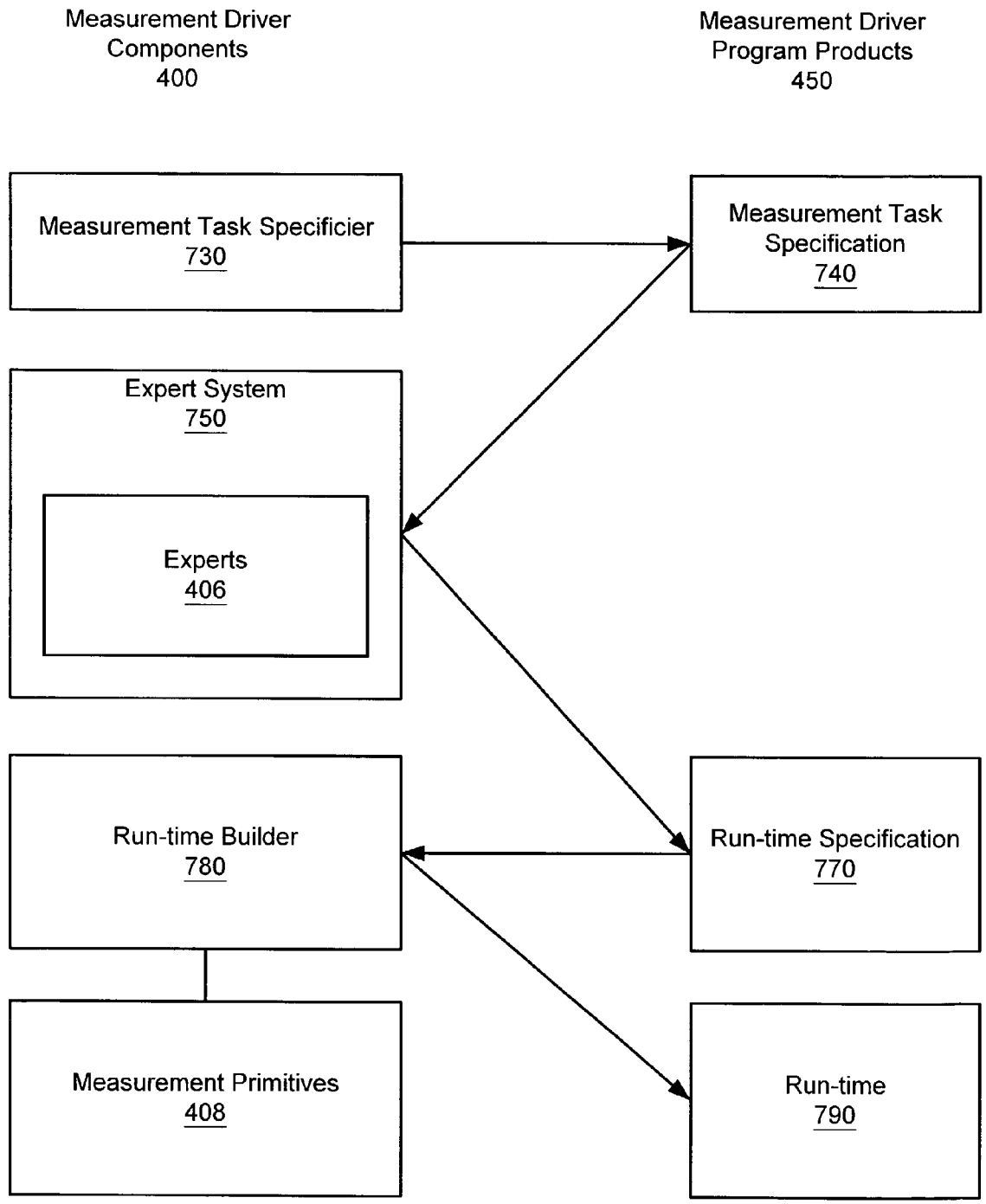
FIG. 6 illustrates measurement driver program components, according to one embodiment.

FIG. 6—Measurement Driver Program Components

FIG. 6 illustrates various software components or programs 400 comprised in the measurement driver program 212. As shown, the measurement driver program 212 may include a measurement task specifier 730, and optionally, an expert system 750 with one or more experts 406, a run-time builder 780, and/or various measurement primitives 408. The measurement driver 212 may include other software components as well.

As FIG. 6 also illustrates, various of the measurement driver components may be operable to generate respective products 450 which may be useable by other measurement driver components, by other software programs or systems, or by a user. More specifically, as shown in FIG. 6, in one embodiment, the measurement task specifier 730 may be operable to generate a measurement task specification 740, also referred to as a task specification. It is noted that the specified measurement task may include both measurement (i.e., inputs) and generation (i.e., outputs) type tasks. For example, in a testing application, the measurement task may include generating one or more signals for excitation or stimulation of an UUT, as well as measuring the response of the UUT to the generated signal(s). The generated signal(s) may also include signals for triggering, synchronization, communication, control, or other functions, as desired. Examples of generated signals include sine wave, square wave, gaussian pulse, and sawtooth waveforms, among others.

In one embodiment, the measurement task specification 740 may comprise software objects or data structures, such as C++ objects, which may specify the measurement task. In one embodiment, the measurement task specifier 730 may be a measurement task wizard, i.e., a software program which leads the user through a measurement task specification process to create the measurement task specification 740. In another embodiment, the measurement task specifier 730 may take the form of a measurement task configuration tool, which is a software program invocable by the user under a development environment, such as the National Instruments LabVIEW environment or Measurement Studio programming development environment. In yet another embodiment, the measurement task specifier 730 may simply be an API through which the user makes calls to generate the task specification. Thus, in various embodiments, the measurement task specifier 730 may generate the measurement task specification 740 in response to user input.

As shown, an expert system 750 may use the measurement task specification 740 to generate a run-time specification 770. The expert system 750 may include a plurality of experts. The expert system 750 may include one or more experts for each of the measurement device types shown in FIGS. 3A and 3B, in addition to various other experts, including routing experts, streaming experts, and synchronization experts, among others. In one embodiment, the expert system 750 may also be utilized by the measurement task specifier 730 in generating the measurement task specification 740. For example, the measurement task specifier 730 may invoke the expert system 750 to validate the measurement task specification 740. In other words, the expert system 750 may analyze the measurement task specification 740 to verify that the specified task is implementable with available software and/or hardware, and/or that the measurement task specification 740 is internally and/or externally consistent. For example, the expert system 750 may detect that two components or sub-tasks specified in the measurement task specification 740 are mutually incompatible, and report an error accordingly.

In one embodiment, the run-time specification 770 may similarly comprise software objects or data structures, such as C++ objects, which may specify the run-time parameters for software and/or hardware used to implement the specified measurement task. The run-time specification 770 may comprise parameter specifications for one or more measurement primitives 408 which correspond to rudimentary measurement tasks or operations. Said another way, the run-time specification 770 may comprise a collection of primitive settings, each of which may comprise a detailed and unambiguous "recipe" for a primitive. For example, primitive settings for a digitizer, such as a National Instruments E-Series digitizer, may include: Dither (Yes, No), Polarity (Bipolar, Unipolar), Gain, Mode (Calibration, Differential, Non-Referenced Single-Ended, Referenced Single-Ended, Auxillary, Ghost), Generate Trigger (Yes, No), and Last Channel (Yes, No).

The run-time specification 770 may in turn be interpreted by the run-time builder 780 to generate a run-time 790, which may be executable to perform the specified measurement task. More details of the operation of the measurement driver program are presented below with reference to FIG. 7.

Figure 7:
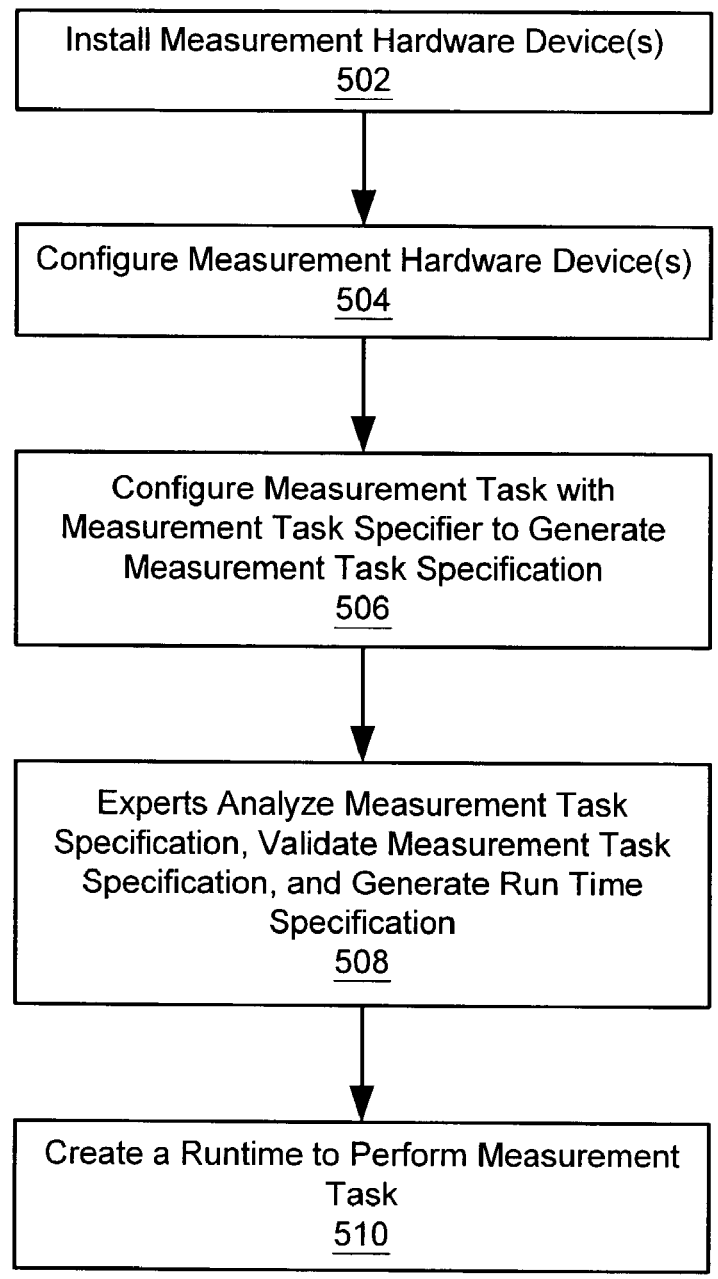
FIG. 7 flowcharts a measurement process, according to one embodiment.

FIG. 7—Method For Performing A Measurement Task

FIG. 7 is a flowchart diagram illustrating one embodiment of the operation of the measurement system, the method being used to configure installed measurement hardware devices and to specify and create a measurement task or application program to operate the measurement system. In one embodiment, the measurement task may comprise a plurality of measurement sub-tasks. In another embodiment, the measurement task may comprise a complex measurement operation using a plurality of measurement devices. It is noted that the flowchart of FIG. 7 is exemplary only. Further, various steps in the flowchart of FIG. 7 may occur concurrently or in different order than that shown, or may not be performed, as desired. Also, various steps may be added as desired.

As shown, in step 502 a user may optionally install measurement hardware within the system. This may comprise connecting a measurement device to the computer system or installing a measurement card or board within a slot of the computer system. This may further comprise installing a measurement card or board in a slot of a chassis, such as a PXI chassis, which itself is coupled to the computer system and/or which may contain a computer system comprised on a card within the chassis. In one embodiment, the measurement hardware may comprise a "reconfigurable measurement device" which may be operable to be reconfigured "on the fly" during a measurement task or operation. For example, the reconfigurable measurement device may include a processor and memory or an FPGA that may be reconfigured with different measurement programs or tasks.

In step 504 the computer system and/or the user may optionally configure the measurement hardware device(s). This may involve operation of standard Plug & Play software to recognize the measurement device and select setting or parameters for the device. It should be noted that in many instances, the user may not be required to perform 502 and/or 504 before generating the measurement task. In other words, the measurement hardware may already be installed and configured and the user may proceed with the configuration and specification of the measurement task in step 506. In another embodiment, "stub" interfaces may be provided, e.g., in software, which emulate the presence of measurement devices, allowing the user to design or specify the measurement task without actually installing the necessary hardware and/or software.

In step 506 the user may invoke the measurement task specifier 730 to configure a desired task in the measurement driver 212, thereby producing a measurement task specification 740. In the preferred embodiment, the measurement task specifier 730 includes an interactive Graphical User Interface (GUI) configuration tool which enables the user to easily and simply configure a desired measurement task. This may involve selecting various parameters of the task such as the type of measurement being performed, e.g., voltage, current, etc., and other measurement settings.

In one embodiment, once the task has been specified, the user may add specification objects, modules, or code, specifying start, read/write, and/or cleanup operations to the task specification. In one embodiment, once the task has been specified, the user may request the task specifier 730 to generate code. The task specifier may then programmatically generate code specifying start, read/write, and/or cleanup operations, among others. In various embodiments, this generated code may comprise one or more icons in a LabVIEW graphical program (i.e., VIs), as described in more detail below, and/or function calls in a text-based program including one or more of C code, C++ code, C# code, Java code, Visual Basic code, or any other form of computer program code, which may specify support operations needed to implement the specified measurement task. In one embodiment, the generated code may comprise icons representing some or all of the specified measurement task operations, including clocking and trigger operations, among others. In one embodiment, the task specifier 730 may generate the icons and connect them together appropriately. In another embodiment, the task specifier 730 may generate the icons, but the user may be required to link the icons appropriately. Thus, in one embodiment, the method may include generating a measurement task diagram in response to user input specifying the measurement task. In one embodiment, the measurement task diagram may comprise a graphical program, such as a LabVIEW graphical program.

It should be noted that a node for use in a graphical program typically includes a graphical icon which may be displayed in the graphical program to visually represent the node in the graphical program. A node for use in a graphical program may also include underlying program instructions and/or data structures which perform the functionality of the node. When the present application states that a node performs a function, it is understood that the program instructions and/or data structures of the node actually perform this function. Thus, the graphical icon that visually represents the node represents the function, and the underlying program instructions and/or data structures which are represented by the node graphical icon are actually performing the function. Thus the specification and claims of the present application refer generally to a node performing a function, it being understood that the node includes or represents underlying program instructions and/or data structures which are executed by a processor (or programmable hardware element) to perform the function.

In another embodiment, the user may specify the task manually. For example, the user may use a graphical programming development environment such as LabVIEW to place one or more icons or nodes on the display and connect them in a desired way to accomplish the desired result. In one embodiment, the user may select a small number of function icons or nodes, such as a measurement read node or measurement write node, to accomplish the configured measurement task. As another example, the user may use the Measurement Studio programming development environment from National Instruments Corporation (e.g., LabWindows/CVI) to create a text-based program to accomplish the measurement task. This text-based program would typically comprise very few lines of code. Thus, complex measurement procedures may be encapsulated and represented by simple icons or function calls, allowing the user to rapidly and easily create measurement "programs" to implement or carry out complex measurement operations.

In one embodiment, the measurement task specifier 730 may comprise a measurement task wizard. In other words, the measurement task specifier 730 may be a software program which leads the user through a measurement task specification process, thereby generating the measurement task specification 740. In another embodiment, the measurement task specifier 730 may comprise a measurement task configuration tool. The measurement task configuration tool may be a software program invocable by the user within a development environment, such as National Instruments' LabVIEW environment, Measurement Studio programming development environment, or any other development environment. For example, the user may specify or configure a measurement task by placing or "dropping" nodes or icons on a graphical diagram and connecting the nodes via virtual "wires" to generate a graphical diagram or model of the measurement task. The graphical development environment program (e.g., LabVIEW) may generate software objects or data structures corresponding to the components of the graphical diagram which specify the measurement task. These data structures may comprise the measurement task specification 740. In one embodiment, at this stage the measurement task specification 740 is not executable per se, but provides information which may be used by other components of the system to generate a measurement application suitable to carry out the measurement task, i.e., to implement the specified measurement operation.

In another embodiment, the measurement task specifier 730 may be an API through which the user makes calls to generate the task specification. For example, the user may make API function calls in a C++ application program to specify the various attributes or aspects of the desired measurement task, such as measurement type (voltage, current, pressure, etc.), timing or sampling parameters, or other measurement task specification information. The executed functions may produce corresponding data structures which contain specification information for the measurement task. When the application program 202 is executed, the API function calls may generate the measurement task specification 740, which may then be used later in the execution process to produce the run-time specification, as described below.

In step 508 an expert system comprised in the measurement driver may operate to receive the measurement task specification 740, then analyze the measurement task specification 740, validate the measurement task specification 740, and create a run-time specification 770 based on the measurement task specification 740. The run-time specification 770 preferably comprises parameter settings for one or more measurement devices and other hardware comprised within the system, and may also specify software components or software programs which are to be used during execution of the task. In one embodiment, the run-time specification 770 may comprise a specification of the parameters of one or more measurement primitives, where each measurement primitive comprises a software object and corresponding configuration settings, and where each measurement primitive is operable to implement at least a portion of the measurement task. Thus, the run-time specification 770 may be useable to configure one or more measurement devices to perform the measurement task, and may be further useable to generate a run-time 790 which is executable to perform the measurement task using the configured one or more measurement devices. The measurement driver 212 may include expert system 750 comprising the plurality of experts 406 where one or more experts 406 are available for each of the various types of measurement tasks or sub-tasks. Thus, depending upon the type of measurement task configured by the user in step 506, one or more corresponding experts 406 may be invoked to create the run-time specification. In one embodiment, multiple experts may each produce a candidate run-time specification. Thus, the measurement task specification 740 may be used in step 508 to ensure that the measurement task can operate as configured by the user.

In one embodiment, one or more of the generated measurement task specification 740, the generated run-time specification 770, and configuration information for the one or more measurement devices may be stored, such as in a memory medium, e.g., a computer system's RAM or persistent storage medium.

In one embodiment, the run-time builder 780 may analyze the selected run-time specification 770, and then reserve one or more resources, such as hardware and/or software, according to the selected run-time specification 770. The run-time builder 780 may also un-reserve resources if the analysis of the selected run-time specification indicates that previously reserved resources are no longer needed to implement the measurement task. In another embodiment, the run-time builder 780 may handle abnormal process termination and/or unexpected device removal.

In step 510 a run-time 790 may be created which embodies or implements the measurement task configured in step 506 based on the generated (and/or selected) run-time specification 770. In one embodiment, the run-time 790 may comprise a collection of measurement operation primitives (or instances of measurement operation primitives) sequenced together which are executable to implement the measurement task.

When the user (or software program) enters input to execute or run the program, the measurement driver 212 may invoke the run-time builder program. The run-time builder program operates to access the run-time specification and use the parameters and data contained in the run-time specification to assist in creating the run-time at run time. In one embodiment, the run-time builder uses the run-time specification to instantiate instances of various objects or primitives comprised in the measurement driver 212. After the run-time builder instantiates various instances of objects, the run-time builder may apply various parameters from the run-time specification to these object instances. The run-time builder may also provide various parameters to hardware and/or software resources or devices comprised in the system to configure the hardware and/or software devices in the system according to the run-time specification to allow these devices to be used during execution of the run-time 790. In other words, the run-time builder 780 may configure one or more measurement devices according to the run-time specification 770. After the run-time builder 780 has completed creating the run-time 790, the run-time may be executable to perform the task specified by the user.

After step 510 the user (or a software program) may execute the run-time 790 to perform the measurement task. In other words, the run-time execution may invoke the various configured hardware and/or software components to perform the specified measurement task.

It should be noted that the above method, described in terms of a measurement task, may also be applied to other types of tasks, as well, including, but not limited to, machine vision, scientific, engineering, financial, business, e-commerce, and medical tasks, among others.

Figure 8:
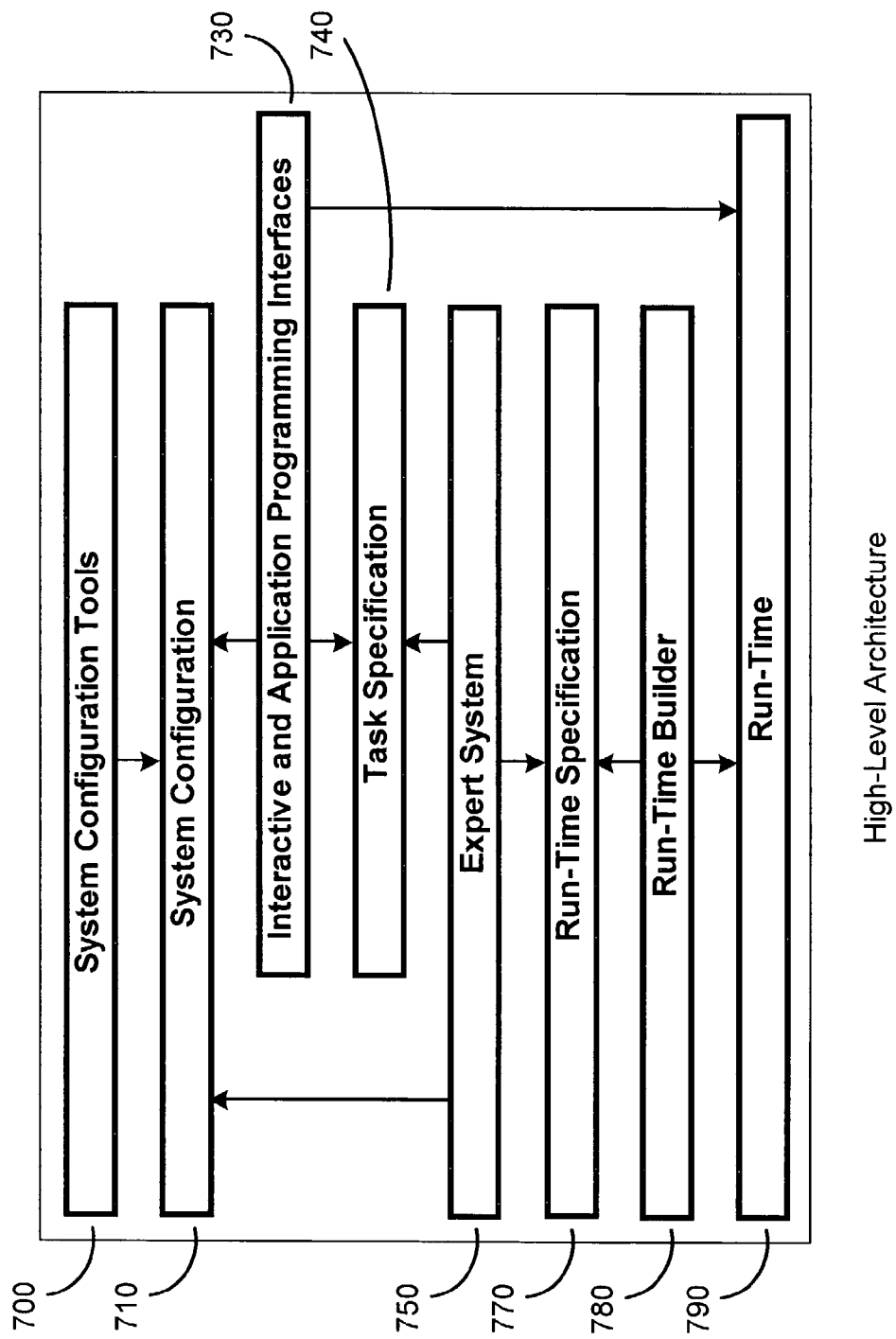
FIG. 8 illustrates a high level architecture of the system, according to one embodiment.

FIG. 8—High-Level Architecture

FIG. 8 is a block diagram of a high-level architecture of a system wherein various embodiments of the present invention may be used, according to one embodiment. As FIG. 8 shows, the primary components of the system may comprise system configuration tools 700, system configuration 710, interactive and application programming interfaces 730 which comprise one or more measurement task specifiers 730, task specification 740, expert system 750, run-time specification 770, run-time builder 780, and the run-time 790. FIG. 8 also shows the communication between the various components.

Figure 9:
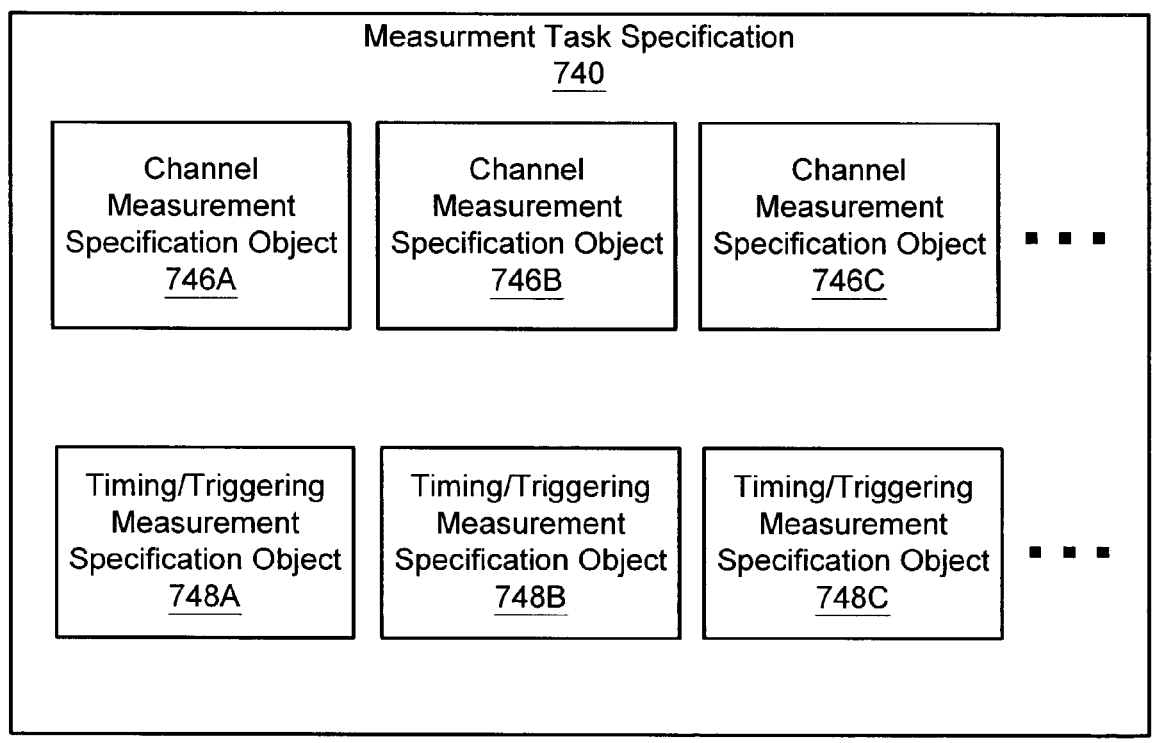
FIG. 9 illustrates a measurement task specification, according to one embodiment.

FIG. 9—Measurement Task Specification

FIG. 9 is a high-level block diagram of a measurement task specification 740, according to one embodiment. As mentioned above, in one embodiment, the measurement task specification may include configuration information for one or more measurement devices, where, after being configured with the configuration information, the one or more measurement devices are operable to perform the measurement task. As FIG. 9 shows, in one embodiment the measurement task specification 740 may include a collection of measurement specification objects (MSOs). Measurement specification objects may comprise atomic objects in the form of data structures or software classes which reflect the primary concepts and collaborations of the measurements domain. In one embodiment, an MSO may simply be a collection of one or more attributes. In other embodiments, an MSO may be a more complex structure which may include additional information as well, such as, for example, information indicating relationships with other entities. The use of these objects may enable complex solutions to be broken down into simpler components in a consistent way. Said another way, the MSOs may describe the user's measurement task in a device-independent manner, and may also be operable to describe device-specific aspects of the task.

As shown, in one embodiment, the MSOs which compose the measurement task specification 740 may include one or more channel MSOs 746 and timing/triggering MSOs 748. The channel MSOs 746 may each include one or more parameters for configuring a channel for the measurement task. For example, channel configuration parameters included in a channel MSO 746 may include one or more of: task name, channel name, terminals, input ranges, units, scales, and sensors, among others. The timing/triggering MSOs 748 may each include one or more parameters specifying timing and/or triggering for the measurement task. Examples of timing parameters include scan rate, number of samples, duration, clock type, and clock source, among others. Example triggering parameters include trigger type, source, edge, level, window, and hysterisis, among others. Thus, each MSO may codify (via one or more parameters) a particular aspect or component involved in performing the measurement task.

One example of an MSO corresponds to a measurement. In one embodiment, a 'measurement MSO' may comprise a phenomenon (i.e., a detectable signal), a terminal configuration, a desired resolution, a name, and one or more constraints. The particular values of these fields may thus specify a particular measurement. Different measurement specification objects may be linked together to form a measurement task specification.

Figure 10:
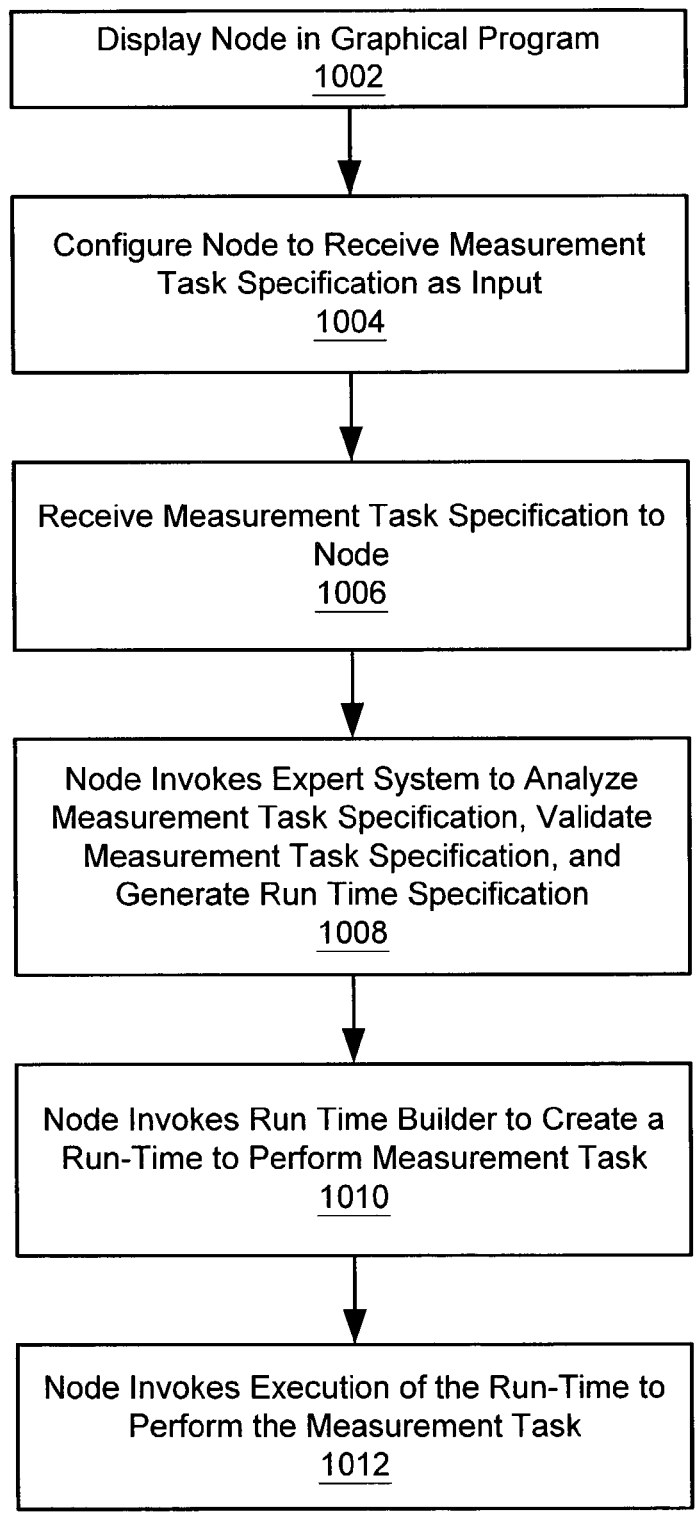
FIG. 10 illustrates a method for using a graphical program node to generate a program for performing a specified task, according to one embodiment.

FIG. 10—Method for Generating a Measurement Program

FIG. 10 flowcharts one embodiment of a method for performing a task, such as a measurement task, based on a task specification. As mentioned previously, in various embodiments, some of the steps may be performed in a different order than shown, or may be omitted. Additional steps may also be performed as desired.

As FIG. 10 shows, in 1002, a node may be displayed in a graphical program. In one embodiment, the graphical program may be a LabVIEW block diagram, although other types of graphical programs are also contemplated. In one embodiment, the graphical program may be generated programmatically. For example, user input to a GUI may be received requesting programmatic generation of the graphical program. The graphical program may then be generated programmatically in response to the user input requesting the generation. The node may be a primitive node provided by a graphical programming development environment for inclusion in the graphical program.

In 1004, the node may be configured to receive a task specification as input. In one embodiment, configuring the node to receive the task specification may include connecting an input terminal of the node to an output terminal of another node in the graphical program. In one embodiment, the other node is a task specification node which represents a generated task specification characterizing or specifying a desired measurement task. In another embodiment, the other node may be a configuration node which operates to configure a task specification for input to the node. The configuration node may operate in conjunction with zero or more other configuration nodes to generate the task specification during execution of the graphical program. In other words, one or more configuration nodes may incrementally add configuration information to the task specification, thereby building a complete task specification for input to the node. Examples of configuration nodes include, but are not limited to, a channel configuration node, which is operable to add channel configuration information to the task specification, a timing configuration node, which is operable to add timing configuration information to the task specification, and a triggering configuration node, which is operable to add triggering configuration information to the task specification.

In one embodiment, a graphical user interface (GUI) for specifying the task may be presented to a user. User input to the GUI may be received indicating values for a plurality of parameters characterizing the task, where the values are useable in generating the task specification. The task specification may then be generated based on the values for the plurality of parameters. The task specification node may then represent the task specification in the graphical program.

The measurement task may include one or more measurements and/or one or more signal generations. When the measurement task includes a measurement, the node may be a read node. When the measurement task includes a signal generation, the node may be a write node. In one embodiment, the node may be a start node, also referred to as a play node, which is operable to be connected to a read node for performing a measurement, or a write node for performing a signal generation. The GUI may also display a stop node in the graphical program, where the stop node is also connected to the read or write node. The stop node may be operable to terminate the measurement task, i.e., the measurement (read) or signal generation (write). Examples of several embodiments of the node in a graphical program are presented in FIGS. 11A-13F, and described below.

Once the node is configured, the graphical program may be executed to perform the specified task. For example, in one embodiment, the node may be executed in the graphical program. In other words, execution of the graphical program may include executing the node, as described in more detail below.

In executing the graphical program, the node may receive the task specification as input, as indicated in 1006. In one embodiment, executing the graphical program may include the node invoking execution of a program to perform the task. For example, the node may invoke an expert system to analyze the task specification, then generate the program based on results of the expert system, where the program is operable to perform the task. The steps below present one embodiment of a way for the node to accomplish this.

In 1008, the node may invoke the expert system to analyze the task specification and generate a run-time specification for the measurement task in response to the analyzing. In one embodiment, the expert system may also validate the task specification prior to generating the run-time specification. For further information regarding the invocation of the expert system to generate the run-time specification, please see U.S. patent application Ser. No. 10/008,792 titled "Measurement System Software Architecture for Easily Creating High-Performance Measurement Applications", U.S. patent application Ser. No. 10/010,829 titled "Measurements Expert System and Method For Generating High-Performance Measurements Software Drivers", and U.S. patent application Ser. No. 10/010,826 titled "A System of Measurements Experts and Method for Generating High-Performance Measurements Software Drivers", which were incorporated by reference above.

In 1010, after generation of the run-time specification, the node may invoke a run-time builder to analyze the run-time specification and generate a run-time based on the run-time specification, where the run-time may be executable to perform the measurement task. For further information regarding invocation and operation of the run-time builder, please see U.S. patent application Ser. No. 10/008,792 titled "Measurement System Software Architecture for Easily Creating High-Performance Measurement Applications", which was incorporated by reference above.

Finally, as indicated in 1012, the node may invoke execution of the run-time to perform the specified task, e.g., the measurement task. Thus, the node invoking execution of the program to perform the task may comprise the node invoking execution of the run-time to perform the task. In one embodiment, the run-time builder may configure one or more measurement devices according to the run-time specification, where the run-time executes to perform the measurement task using the configured one or more measurement devices.

Example Virtual Instrument Diagrams

FIGS. 11A-13F described below illustrate graphical programs or Virtual Instruments (VIs) block diagrams utilizing various embodiments of the present invention. For illustrative purposes, VIs implemented in National Instruments LabVIEW™ graphical development environment are shown which use a variety of measurement devices, such as National Instruments E-Series™ Data Acquisition (DAQ) devices, to implement various measurement tasks. It should be noted that these embodiments are for illustrative purposes only, and are not intended to limit the invention to any particular implementations or types of measurement devices.

FIGS. 11A-11E—Graphical Programs for Performing a Voltage Measurement

Figure 11A:
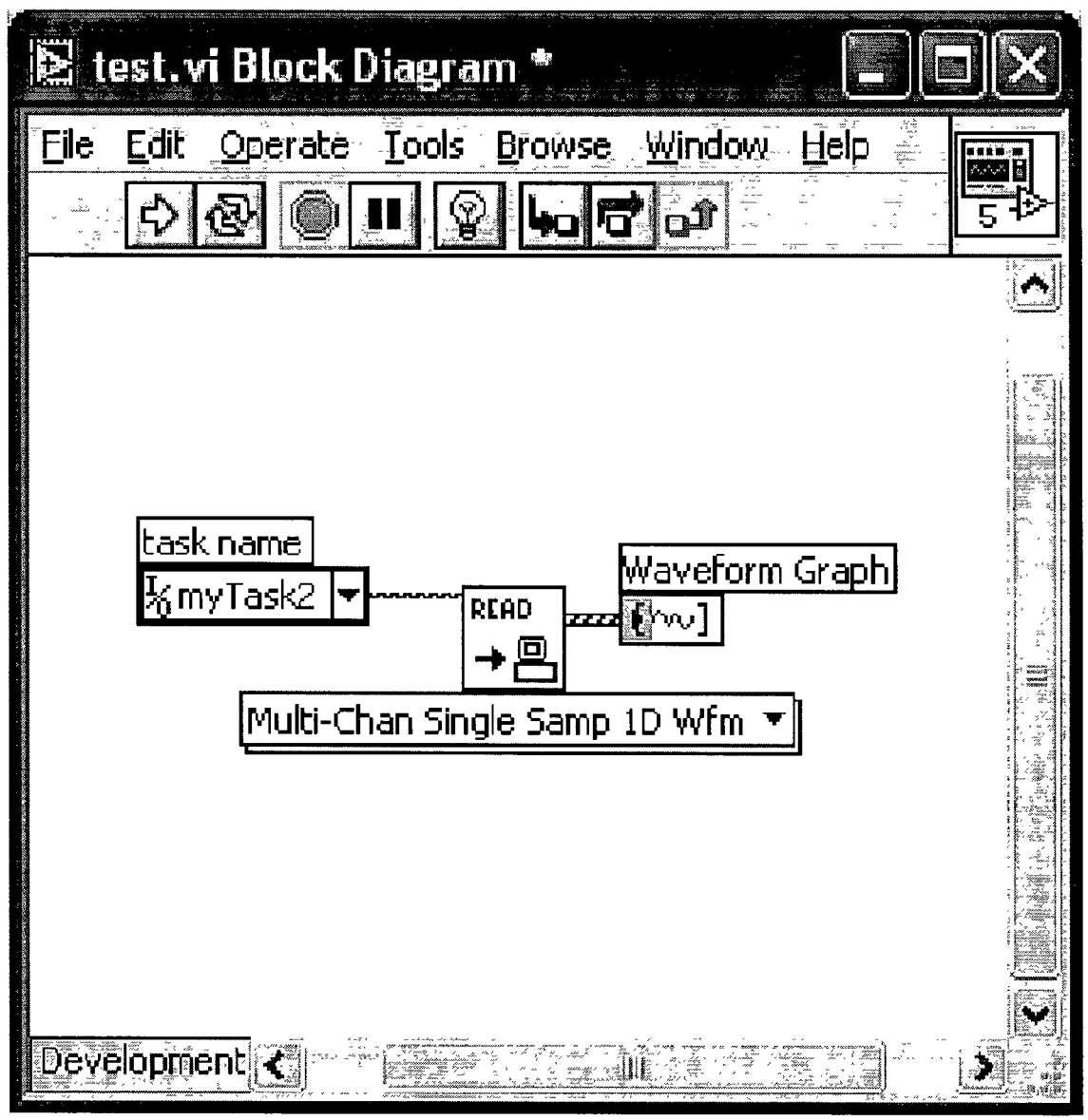
FIGS. 11A-11E illustrate various embodiments of a graphical program for performing a voltage measurement.
Figure 11B:
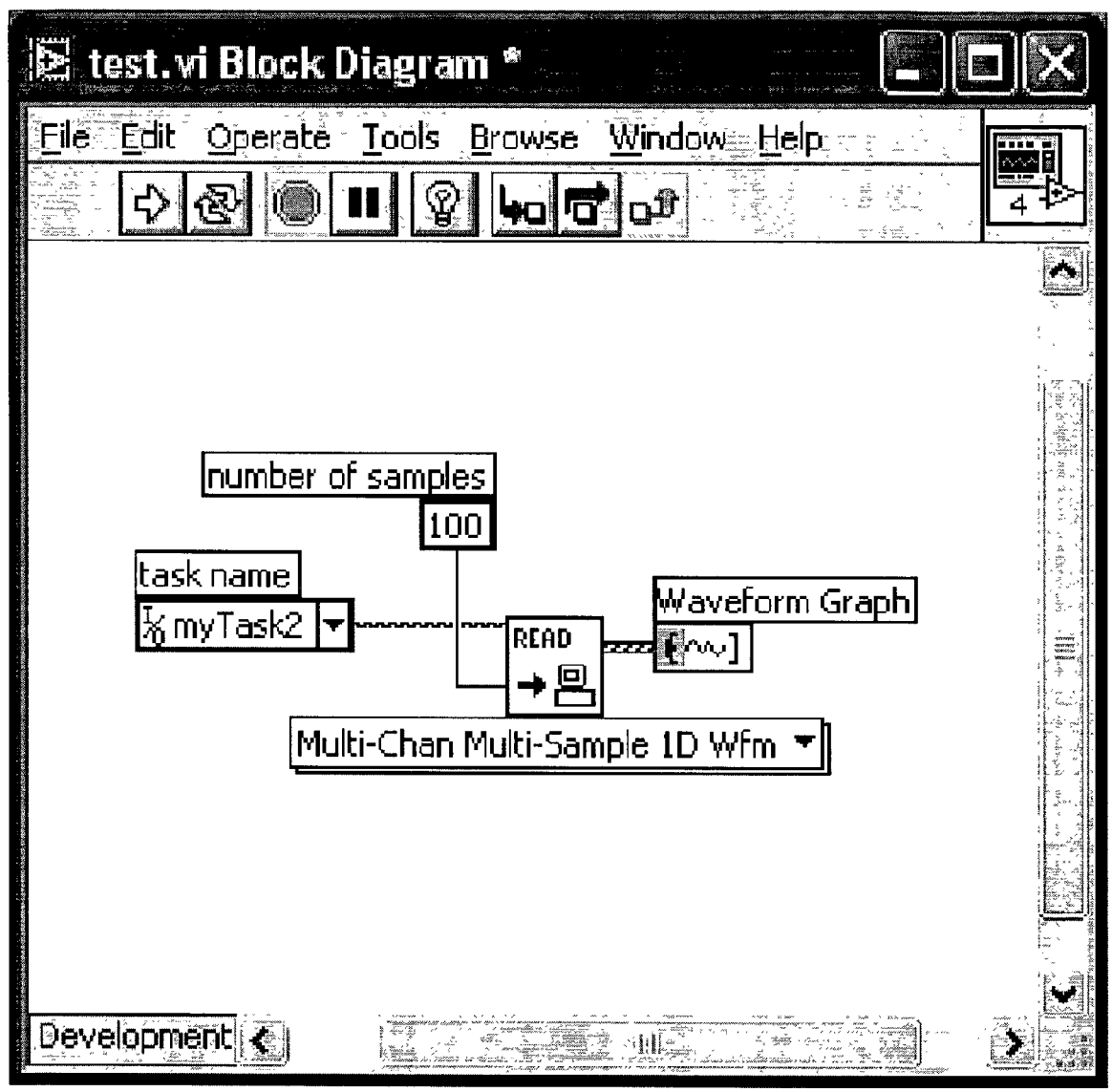

FIGS. 11A-11E are examples of graphical programs for performing a voltage measurement, according to one embodiment. Each example graphical program shown uses an embodiment of the node described above. In FIG. 11A, a single sample measurement is coded into a block diagram as a single node which accepts as input the configured measurement task specification 740, here labeled myTask2. FIG. 11B illustrates a generated block diagram of the same program, but with N samples (in this case, 100 samples) taken instead of a single sample.

Figure 11C:
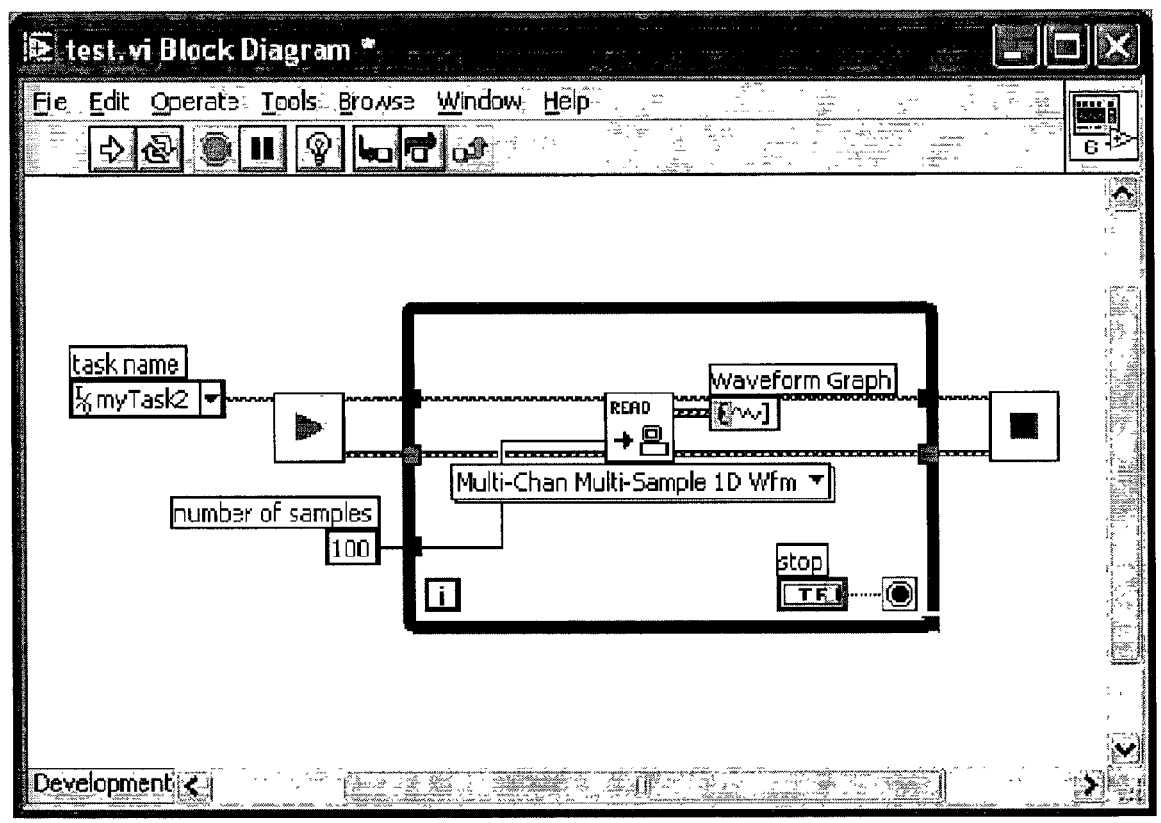
Figure 11D:
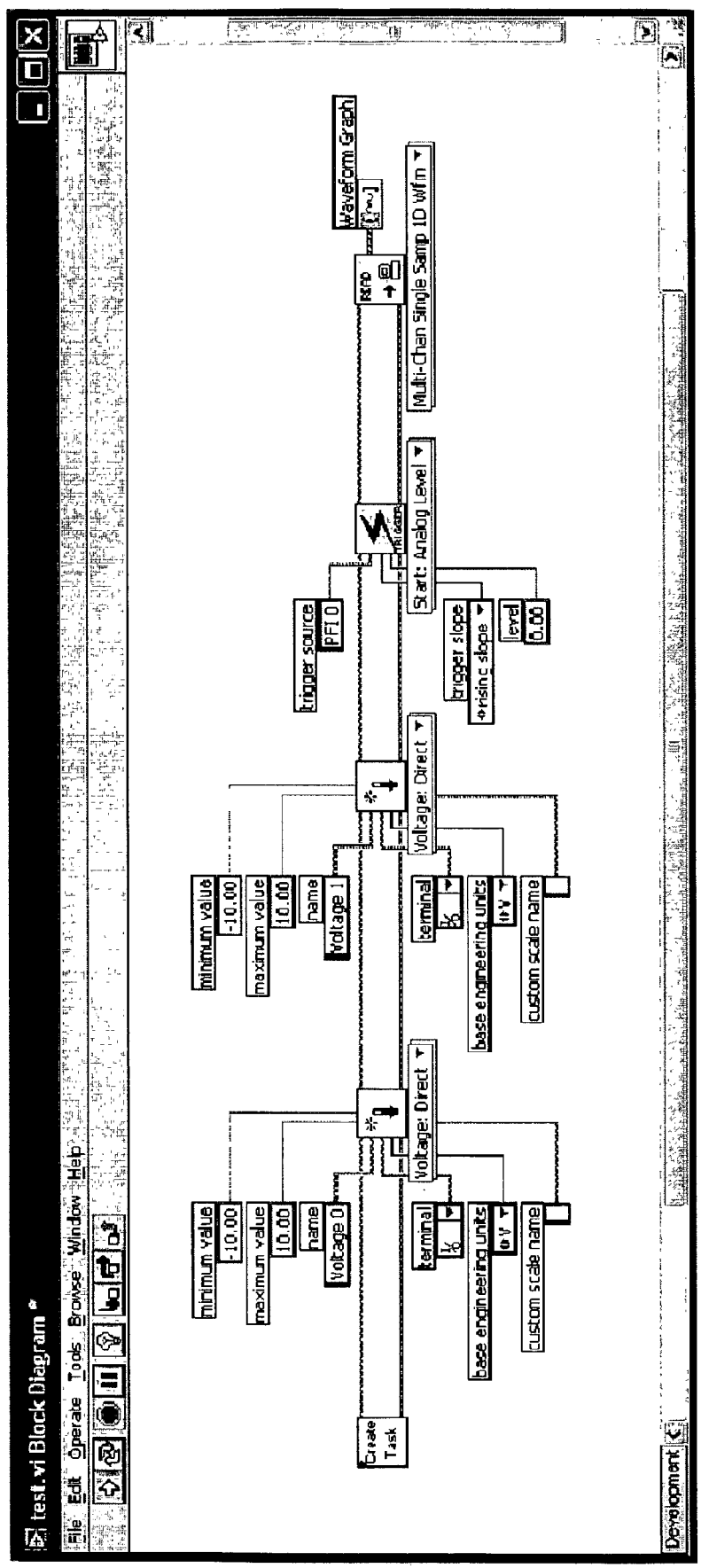
Figure 11E:
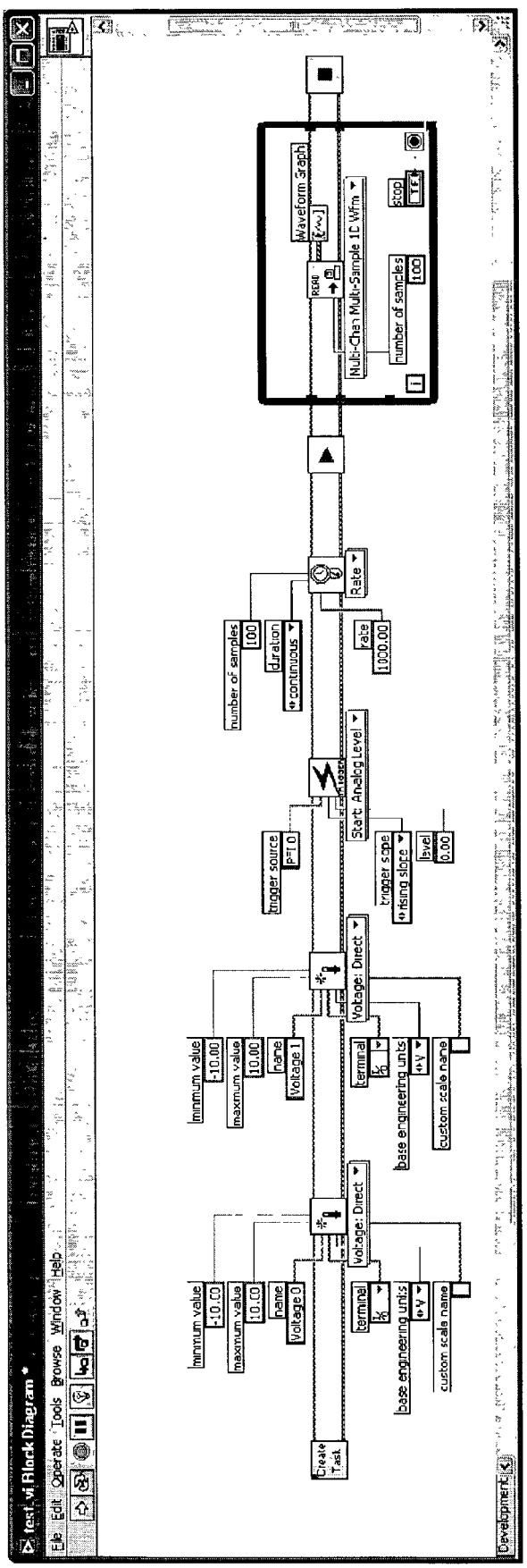

It should be noted that the single node, be it a read node, as in FIGS. 11A, 11B, and 11D, or a start node, as in FIGS. 11C and 11E, may encapsulate or encode both the conversion of the measurement task specification 740 into an executable run-time 790, as well as the execution of the run-time to perform the specified task, as described above FIG. 10.

In other words, the graphical program may include a node which is configured to receive the measurement task specification as input. Upon execution of the graphical program, the node may receive the measurement task specification as input, invoke an expert system to analyze the measurement task specification and generate a run-time specification for the measurement task in response to the analyzing, as described above. The node may then invoke a run-time builder to analyze the run-time specification and generate a run-time based on the run-time specification. Finally, the node may invoke execution of the run-time to perform the measurement task. Thus, the single node may operate to convert the measurement task specification to an executable run-time, and execute the run-time to perform the specified measurement task.

FIG. 11C illustrates a generated block diagram of the same program, but configured for continuous acquisition, i.e., for continuous sampling. In this case, in addition to the read node (embedded in a loop), there are explicit nodes for starting (e.g., a play or start node) and stopping (e.g., a stop node), respectively. In one embodiment, the start node may be or may function as the single node described above. In other words, the start node may receive the measurement task specification 740 as input, invoke the expert system 750 and run-time builder 780, as described above, thereby generating the run-time 790, and execute the generated run-time to perform the specified measurement task.

As FIG. 11C shows, in this example, the start node accepts the task as input, and is further wired to the read node through the loop. The read node is further wired to the stop node. The explicit start and stop nodes may be necessary because of the lack of starting and stopping conditions implicit in the task specification. In other words, the measurement task involves continuous acquisition of data until termination by the user. In the examples of FIGS. 11A and 11B, the start node (i.e., play node) and the stop node may be considered to be implicit in the read node. It is further noted that were the task specified to generate a signal, the read node would be replaced with a write node. As FIG. 11C also shows, the number of samples returned by the read node per iteration cycle (of the while loop) is here specified to be 100 samples. In other words, for each cycle of the while loop, the read node may return 100 samples to the system.

Figure 12:
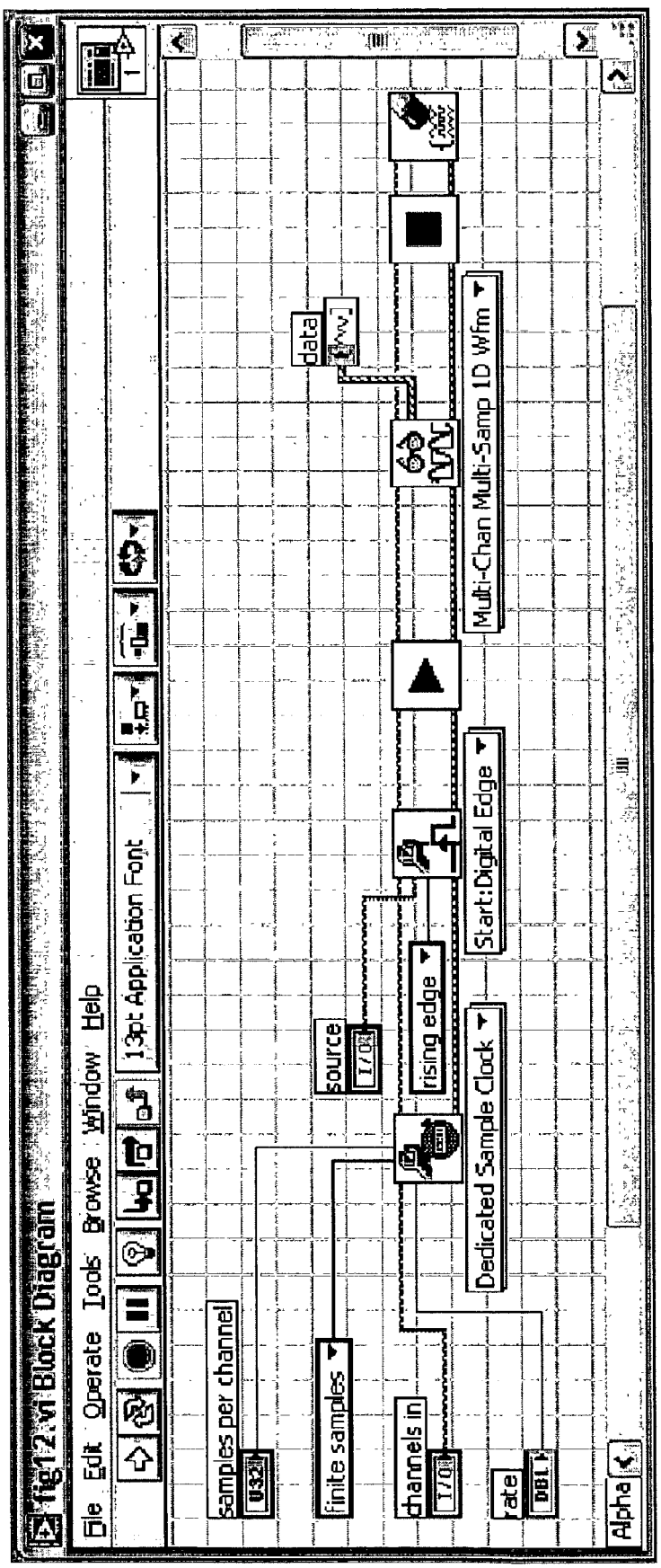
FIG. 12 illustrates a graphical program for performing buffered AI and DI with a shared clock and trigger, according to one embodiment of the present invention.

Note than in one embodiment, a start node (and a stop node) may be used when the measurement task does not include continuous acquisition of data, as shown in FIG. 12, described below.

FIGS. 11D and 11E illustrate examples of graphical programs where the node (e.g., a read/write node, or a start node) receive the task specification from a configuration node.

FIG. 11D is a block diagram of a graphical program for performing the voltage measurement task described above, where the node (a read node) receives the task specification from a configuration node, as described above with reference to FIG. 10, according to one embodiment. In other words, the graphical program may include configuration nodes which operate to generate the measurement task specification from the user-supplied parameters. As FIG. 11D shows, in this embodiment, two channels are used and 1 sample is acquired from each channel. Note the explicit inclusion of channel, clock, and trigger configuration nodes, in addition to the read node. The leftmost node is a "create task" node, which operates to create a measurement task specification container or structure. This container may start out "empty", then be incrementally filled or built up by successive configuration nodes of the program, as shown. The top horizontal wire running through all of the nodes leading to the read node represents the measurement task specification's evolution or build process, and eventual input to the read node. It should be noted that although a create task node is included in this example, in other embodiments, the create task node may be omitted, i.e., the task container may be created implicitly.

Thus, in one embodiment, the single node described above which receives the measurement task specification may be connected or wired to a configuration node, which may in turn be wired to further configuration nodes, and which operates to configure the measurement task specification for input to the node. This is in contrast to the programs of FIGS. 11A-11B where the single node is wired to the measurement task specification node which represents the already generated measurement task specification 740. Thus, the configuration node(s) may operate to generate the measurement task specification 740 for input to the single node.

As FIG. 11D also shows, the next two nodes after the create task node are channel configuration nodes. These two nodes may operate to configure two corresponding channels for the voltage measurement by applying the channel parameters received by the task specifier 730. In other words, the two channel nodes may add channel configuration information to the measurement task specification 740. The next node in the succession is a trigger node which may add trigger configuration information to the specification 740. Note that in the diagram of FIG. 11D, because this is a one sample measurement, no clock configuration node is necessary. The program block diagram of FIG. 11E includes a clock configuration node just subsequent to the trigger configuration node which may add clocking configuration information to the measurement task specification 740. Thus, each successive configuration node may add respective configuration information (based on user input parameters collected or provided by the measurement task specifier 730) to the measurement task specification 740.

Finally, the last configuration node, e.g., the triggering configuration node in FIG. 11D, or the clock configuration node of FIG. 11E, may be wired to the node, thereby providing the resultant measurement task specification 740 as input to the node. Note that this resultant measurement task specification 740 is the same as that generated by the measurement task specifier 730 and represented by the measurement task specification node of FIGS. 11A-11C, described above. In this case, however, the specification 740 is generated "on the fly" during execution of the graphical program.

Note that in the diagram of FIG. 11D, the single node is a read node, for performing the specified finite sampling measuring tasks (i.e., measurements with a defined number of samples). In contrast, in the diagram of FIG. 11E, the single node is a start node rather than a read (or write) node because the measurement task is a continuous acquisition measurement which uses a loop. The start node may be connected to a read node for performing a measurement, and/or a write node for performing signal generation. Note than in this case, a stop node is also included in the diagram for terminating the continuous acquisition task. Thus, the graphical program may include a stop node connected to a read node and/or a write node for terminating a continuous measurement or generation task.

FIG. 12—Buffered AI and Dedicated Sample Clock and Digital Start Trigger

FIG. 12 illustrates a VI for buffered AI with a dedicated sample clock and digital start trigger, according to one embodiment of the present invention. Note the use of the start node (icon with filled triangle) and stop node (icon with filled square) in a finite (fixed number of samples) acquisition task. As described above, the start node may be operable to invoke the expert system and the run-time builder to generate an executable run-time for performing the task.

FIGS. 13A-13F—Repetitive Operation Nodes

In one embodiment, the task may be a repetitive task, where the node (or other graphical program element) may invoke two or more iteration cycles of the program to perform the task. In some applications there may be special conditions related to the initial iteration cycle of the repetitive task. For example, certain variables, data structures, programs, or devices may need to be created and/or initialized before the task is performed. To accommodate these special conditions, the node may be operable to perform one or more operations prior to or during a first iteration cycle of the program. In yet another embodiment, the node may perform one or more operations during the first n iteration cycles of the program, where the value of n may be specified by the user. For example, in an application where the task involves computing a moving average of sample values, the moving average window may be n data points long, and thus may not be "filled" until n iteration cycles have been performed. The node may be operable to perform special operations to accommodate this condition for the first n iteration cycles of the program.

As mentioned above, the graphical program may also include a stop node which operates to terminate the repetitive task. In other words, the stop node may operate to terminate the specified task, e.g., data acquisition by the measurement device, upon fulfillment of stopping conditions, for example, based on a timing or loop count, or user input. In another embodiment, where the node includes implied looping functionality, the node itself may function as the stop node. Where the node invokes two or more iteration cycles of the program to perform the repetitive or iterative task, the node may be further operable to perform one or more operations during or after a final iteration cycle of the program. For example, certain "clean-up" operations may need to be performed just before or during task termination, such as de-allocation of memory for data structures used in performing the task, among others. For another example, in the application described above where the task involves computing a moving average of sample values, it may be the case that whereas the averaging algorithm operates on 20 data points or samples at a time, in the last cycle there may only, say, six data points available. Thus, a boundary condition for the algorithm may exist which must be accommodated for the algorithm to complete successfully. Therefore, in one embodiment, the node may be operable to perform one or more operations during or after a final iteration cycle of the program. In yet another embodiment, the stop node may be operable to perform the one or more operations (during or after a final iteration cycle of the program), as described above.

As described above with reference to FIGS. 11A-11E, graphical programs for tasks which involve continuous sampling may be distinguished from those which specify a finite number of samples by the inclusion of a while loop in the graphical program. However, in some embodiments of the present invention, the functionality of the loop may be incorporated into a node, as described below.

FIGS. 13A-13F illustrate various embodiments of a node in a graphical program for performing repetitive functions, such as continuous acquisitions or signal generations, among other tasks. More specifically, FIGS. 13A-13F illustrate various embodiments of a graphical program node with looping functionality, i.e., the node includes an implied processing loop. Although the examples shown illustrate "while loop" functionality, it should be noted that in other embodiments, "for loop" functionality may be incorporated in the node. In other words, the various embodiments of loop functionality may include executing a function or node continuously or a specified number of times, as desired. Similarly, although the graphical programs of FIGS. 13A-13F include a read node for performing acquisitions, in other embodiments, the node may be a write node for signal generation, or a different type of node for performing other functions.

It should also be noted that the techniques described herein may also be applied to other types of tasks as well, including, but not limited to, machine vision and control, scientific, engineering, financial, business, e-commerce, and medical tasks, among others.

Figure 13A:
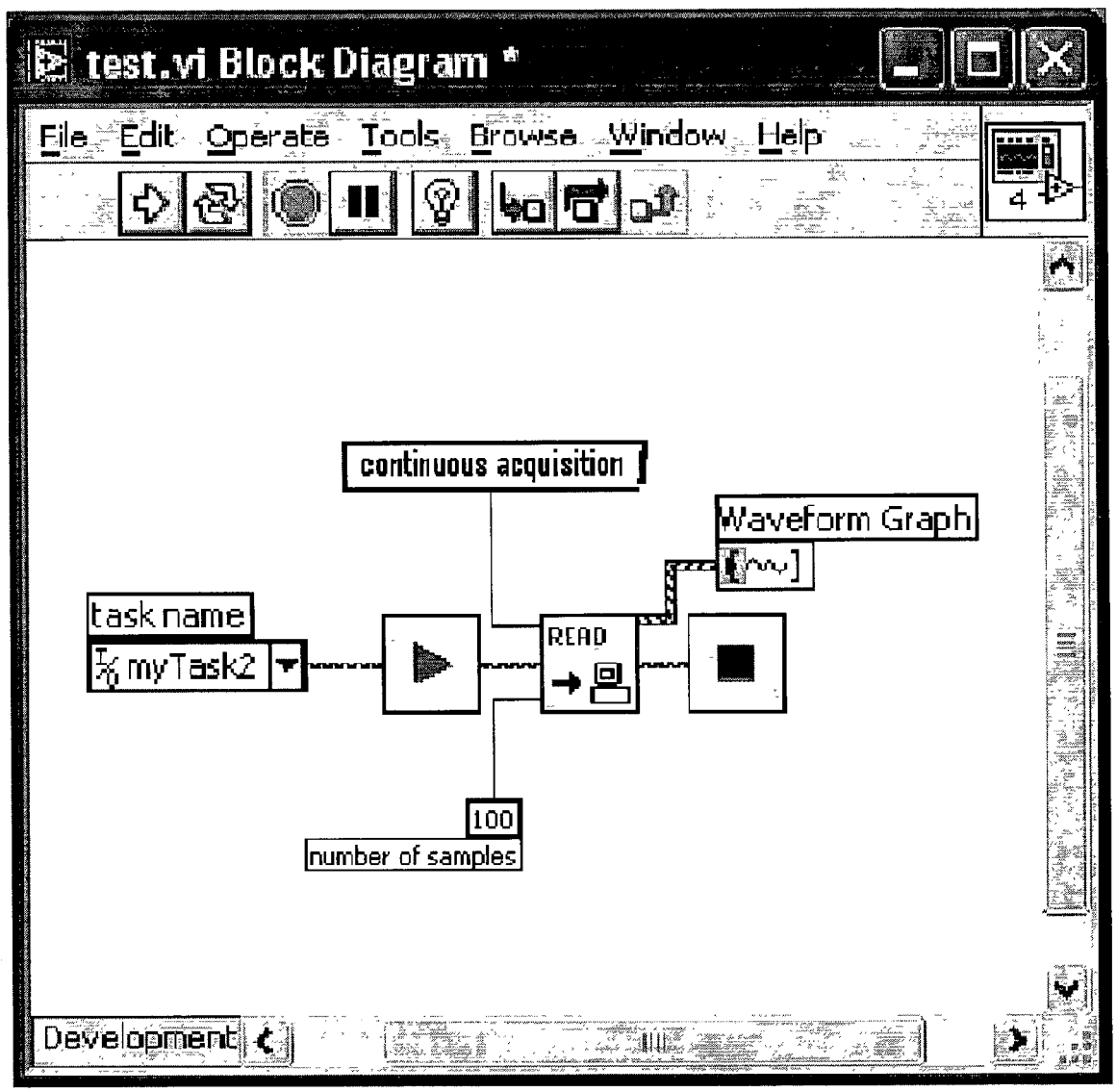
FIGS. 13A-13F illustrate various embodiments of a graphical program node for performing repetitive tasks and/or generating a program to perform repetitive tasks.

Turning now to FIG. 13A, one embodiment of a graphical program is shown in which the node, here shown as a read node, is configured to perform a repetitive task, in this case, a data acquisition task. In one embodiment, the task may comprise a repetitive measurement task, although any other type of repetitive task is also contemplated.

In this embodiment, configuring the node to perform the repetitive task includes displaying a different node or icon, e.g., a looping configuration node, in the graphical program which represents a repetitive task parameter, and connecting the node to the different node to indicate that the node is to execute repetitively in accordance with the repetitive task parameter. Said another way, rather than displaying the node in a loop structure in the graphical program, the node may be connected to another node in the graphical program which specifies looping functionality. The node may then be operable to perform iterative tasks. In one embodiment, the node may receive looping specifications from the different node, but implement the looping functionality itself. In another embodiment, the different node, e.g., the looping configuration node, may execute to perform the looping functionality for the iterative task.

As FIG. 13A shows, in this embodiment, the node specifying looping functionality indicates continuous acquisition, meaning that the read function (i.e., the read node) may execute continuously until stopped by a user or other mechanism. In other words, the repetitive task parameter indicates that the node is to execute continuously. In this embodiment, the loop specification or configuration node indicates the loop functionality with the phrase "continuous acquisition", although in other embodiments, the loop functionality may be indicated in other ways. For example, the node may simply display the term "continuous" to indicate continuous repetition of the function or task. In another embodiment, the repetitive task parameter may indicate that the node is to execute a specified number of times. For example, the looping configuration node may indicate that the read node is to execute 50 times, as indicated in FIG. 13F, described below. It should be noted that the looping specification is distinct from the number of samples specification. More specifically, in a repetitive task, the number of samples refers to the number of samples collected by the node from the device per loop cycle, as illustrated in FIG. 13F.

As FIG. 13A also shows, a start node may couple to the read node. The start node may operate to receive a task specification and generate a program, e.g., a run-time, for performing the specified task, as described above. The start node may also invoke execution of the program upon execution of the graphical program. Note also the inclusion of a stop node in the graphical program. The stop node may serve to terminate the task, e.g., the data acquisition process, as also described above.

Figure 13B:
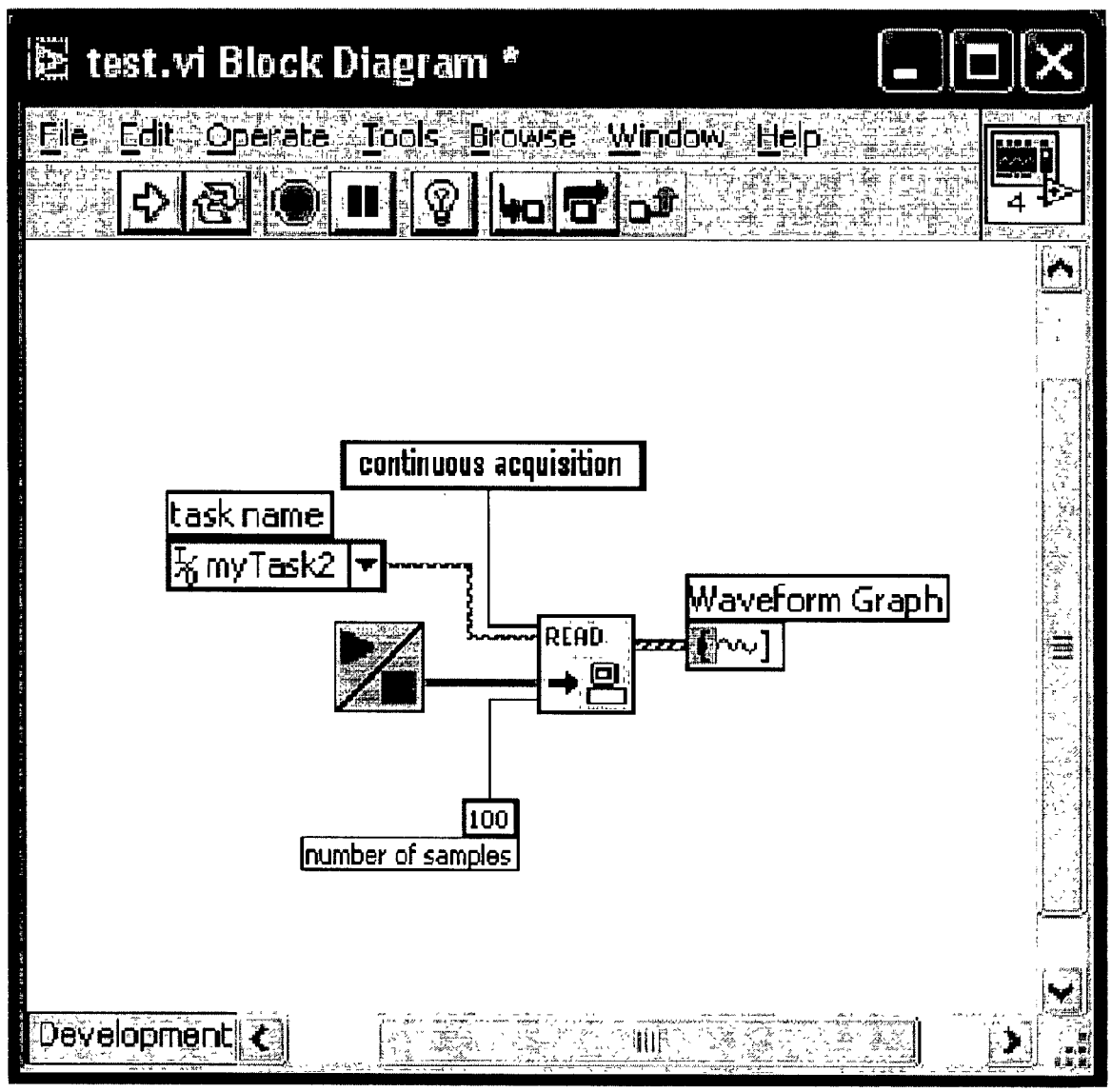

FIG. 13B is similar to the graphical program of FIG. 13A, but rather than using play and stop nodes to initiate and terminate the task, a GUI element may be displayed which is operable to control operation of the graphical program. For example, the GUI element may be operable to control start and/or stop operations of the task performed by the graphical program. In one embodiment, the GUI element may be displayed in the graphical program. For example, as FIG. 13B shows, in one embodiment, the GUI element may comprise a start/stop node which is connected to the read node as shown, and which may be operable to initiate and terminate execution of the task and/or the graphical program. For example, the GUI element may be operable to receive user input to invoke execution of the graphical program. Then, the GUI element may be operable to receive further user input to terminate execution of the graphical program. In one embodiment, the GUI element may be a toggle switch which operates to alternately control start and stop operations of the graphical program and/or task.

In the embodiment shown, the read node may operate to invoke the expert system and run-time builder to generate the run-time, as described in detail above. It should be noted that in another embodiment, the GUI element may be operable to receive the task specification, and invoke the expert system and run-time builder. Thus, the GUI element may serve to start and stop the repetitive task, and may also provide the functionality described above regarding the start node.

Figure 13C:
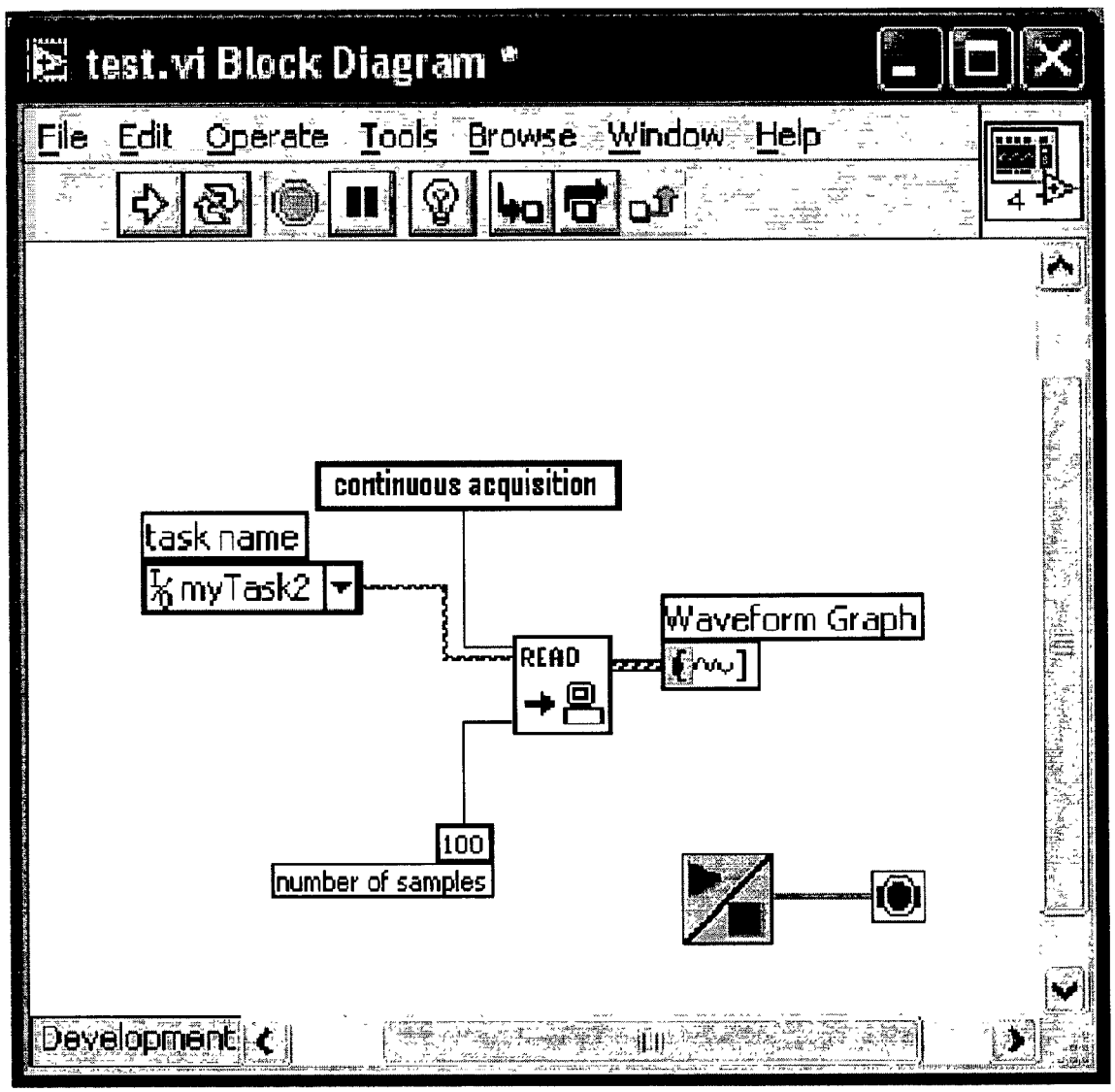

As FIG. 13C illustrates, in one embodiment, the GUI element may comprise a terminal displayed in the graphical program which indicates that a corresponding control, e.g., displayed in a panel separate from the graphical program, may be operable to control start and/or stop operations of the task performed by the graphical program or of the graphical program itself.

Figure 13D:
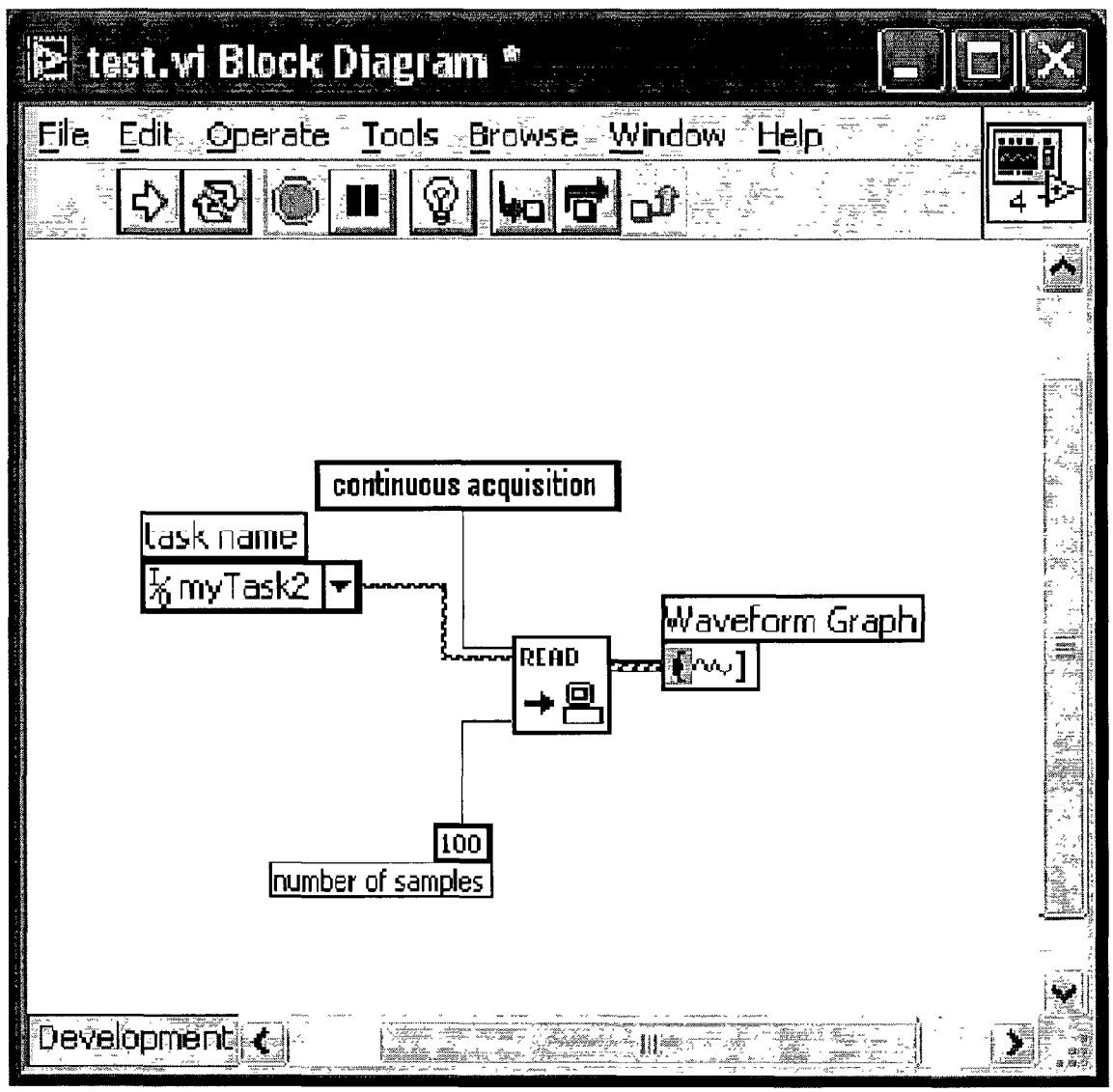

As shown in FIG. 13D, in another embodiment, the GUI element may be displayed in a panel separate from the graphical program, i.e., the GUI element may not be displayed in the graphical program at all. In this case, the fact that the operation is specified as "continuous" implies that a control (the GUI element) may be provided (in a separate panel, menu, etc.) for starting and/or stopping execution of the task and/or graphical program.

Figure 13E:
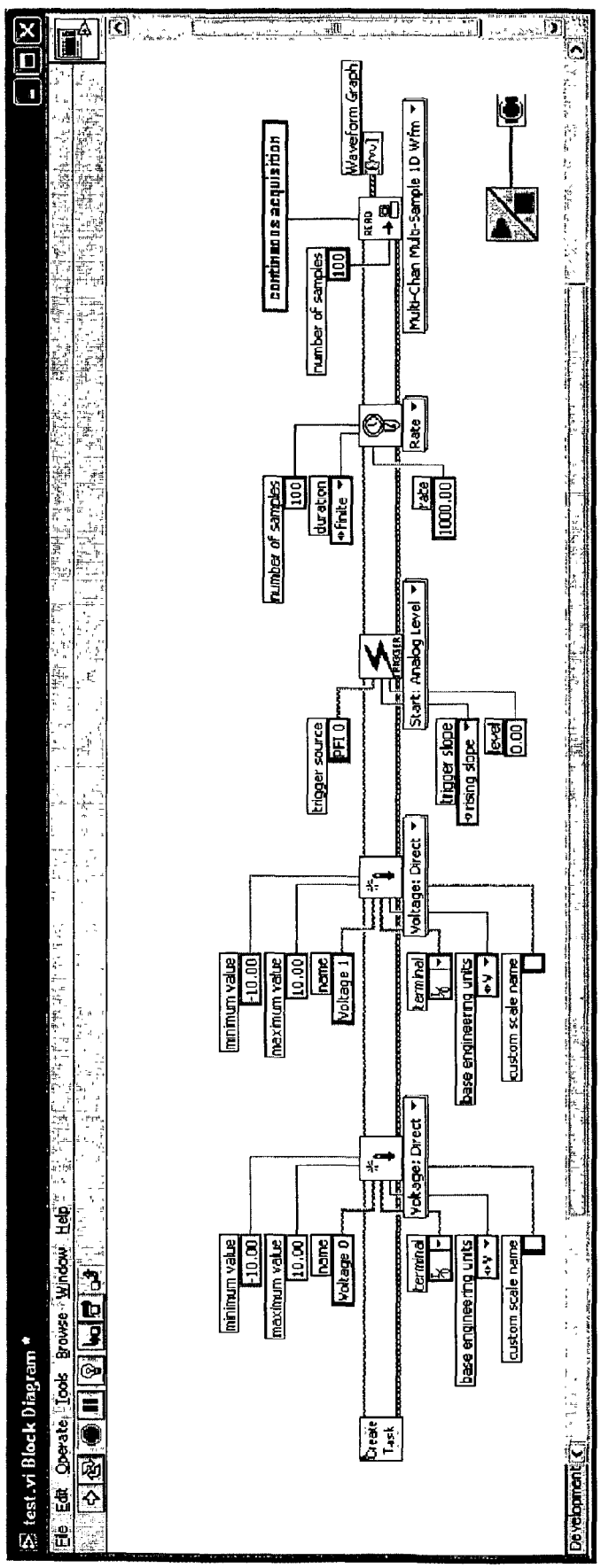
Figure 13F:
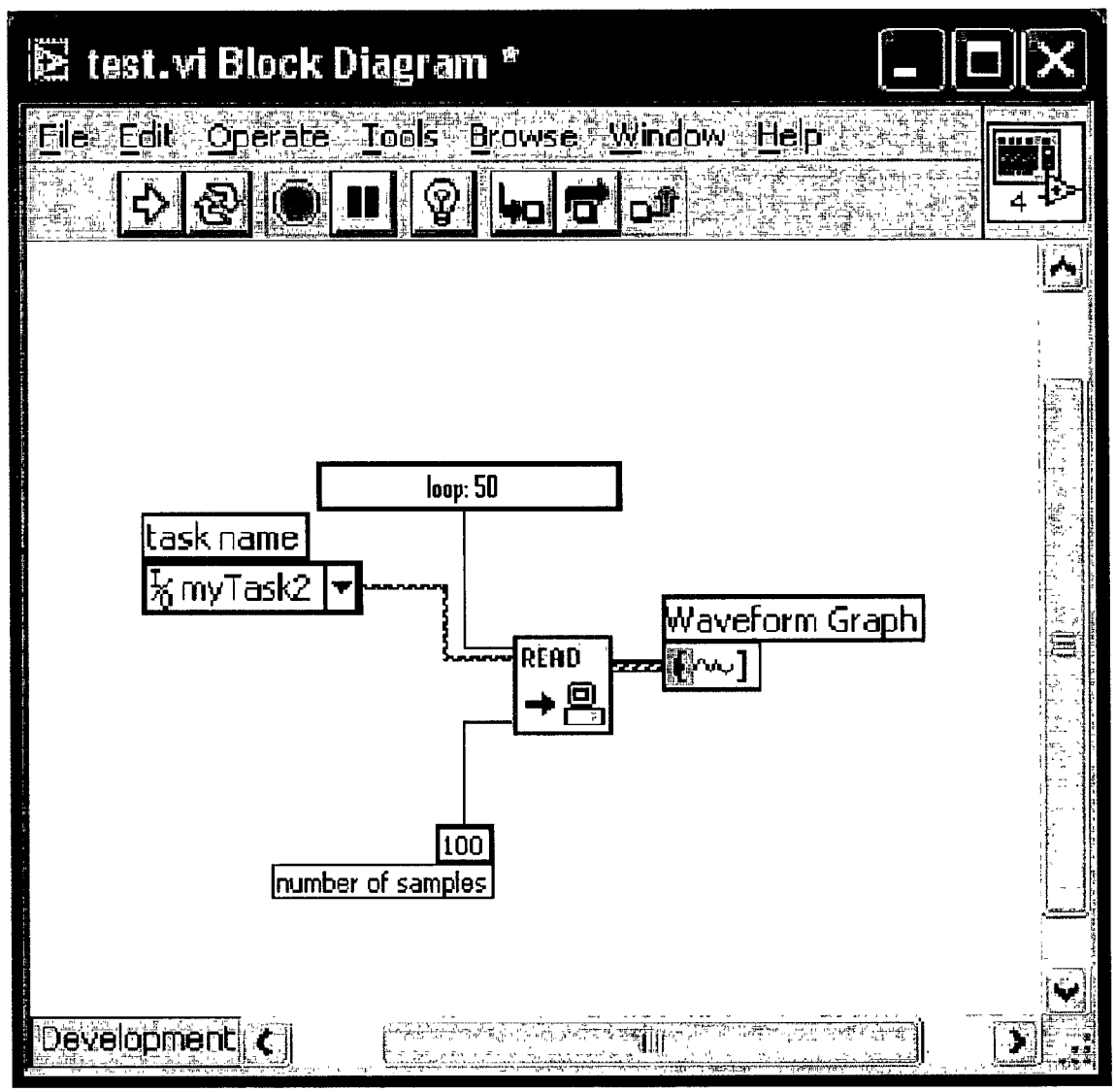

FIG. 13E illustrates an embodiment in which the configuration nodes described above are included in the graphical program. As FIG. 13E shows, the node (in this case, a read node) is configured for continuous acquisition, and the GUI element comprises a terminal representing a control, such as a button or toggle switch, displayed elsewhere, as described above. It should be noted that in another embodiment, the GUI element displayed in FIG. 13E may be operable to receive user input to control operation of the graphical program. Thus, in various embodiments, the GUI element may be a passive terminal, or may be an active control, as desired.

Turning now to FIG. 13F, a graphical program is shown illustrating a repetitive read or data acquisition task where the node receives a loop specification and a number of samples specification. In this example, the loop specification node indicates a value of 50 for the repetitive task parameter mentioned above, thus, the program invoked by execution of the read node may iterate 50 times to perform the repetitive task. Additionally, as FIG. 13F shows, each iteration cycle of the program may acquire 100 samples, as indicated. Thus, in one embodiment, the node may, in effect, include an implied "for loop" structure.

Figure 14:
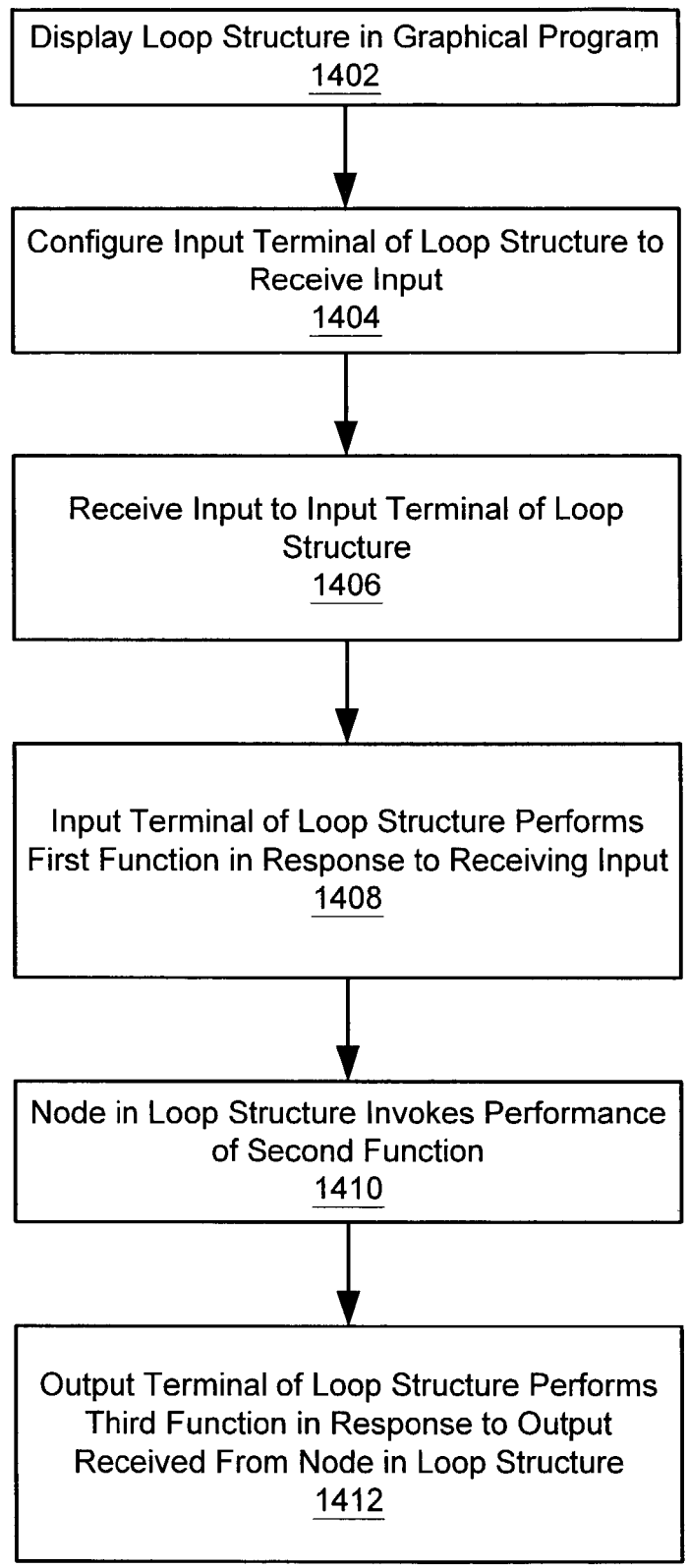
FIG. 14 flowcharts one embodiment of a method for performing a task using a loop structure.

FIG. 14—A Method for Performing a Task Using a Loop Structure

FIG. 14 is a flowchart of one embodiment of a method for performing a task using a loop structure in a graphical program. In one embodiment, the method may operate as part of a measurement system, the method being used to configure installed measurement hardware devices and/or to create a program to operate the measurement system, although other domains of application are also contemplated. It is noted that the flowchart of FIG. 14 is exemplary only. Further, various steps in the flowchart of FIG. 14 may occur concurrently or in different order than that shown, or may be omitted, as desired. Also, various steps may be added as desired.

As FIG. 14 shows, in 1402, a loop structure may be displayed in a graphical program, where the loop structure indicates that at least a portion of the task is to execute repetitively. The loop structure may include an input terminal, also referred to as a loop entry terminal, representing performance of a first function. In other words, the input terminal of the loop structure may be a graphical representation of program instructions which are executable to perform the first function.

In 1404, the input terminal of the loop structure may be configured to receive an input. In one embodiment, the input may comprise a task specification which specifies the task, as described above. In one embodiment, the graphical program may also display at least one node representing the task specification. The input terminal of the loop structure may be configured to receive the input by connecting the task specification node to the input terminal of the loop structure.

In 1406, the input terminal of the loop structure may receive the input, e.g., may receive the task specification as input. In other words, the graphical program may be executed, thereby invoking the input terminal of the loop structure to receive the input, e.g., from the task specification node. In another embodiment, the input terminal may receive the task specification from a configuration node, as described above with reference to FIG. 13E.

The input terminal of the loop structure may then perform the first function in response to receiving the input, as indicated in 1408. The first function may provide various initialization, creation, or set-up operations for performing the specified task. For example, in one embodiment, the first function may initialize one or more nodes contained within the loop structure. In another embodiment, the first function may operate to generate a program based on the task specification, where the generated program may be executable to configure a device (or devices) to perform at least a portion of the task. Various approaches for generating the program are described above with reference to FIGS. 7 and 12.

In one embodiment, the method may include receiving user input selecting the first function to be performed by the input terminal of the loop structure. In other words, prior to executing the graphical program, user input specifying the functionality of the first function may be received. For example, the functionality of the first function may be included in the task specification, which, as described above, may be generated based on received user input. Other examples of functions which may be performed by the input terminal (the loop entry terminal) are described above with reference to FIGS. 13A-13F.

In 1410, the loop structure may invoke performance or execution of a second function. In one embodiment, the second function may be represented by a node displayed in the loop structure, where the node is connected to the input terminal of the loop structure (e.g., from inside the loop structure). Thus, executing the graphical program may further include the input terminal of the loop structure providing an output to the node, and the node performing the second function in response to the node receiving the output. The loop structure may indicate that nodes contained in the loop structure are to execute repetitively, and thus, the node performing the second function may comprise the node performing the second function repeatedly.

In another embodiment, one or more nodes may be displayed in the loop structure, where the one or more nodes represent performance or execution of one or more second functions. At least one of the nodes may be connected to the input terminal of the loop structure to receive the output from the input terminal of the loop structure, and the one or more nodes may then perform the one or more second functions. In various embodiments, the second function or functions may include one or more of: acquiring data from the device, analyzing data received from the device, and/or generating data to the device. In other words, the second function(s) may perform measurements, signal generation, and/or analysis, as desired. It should be noted that the signal generation may include generating a signal for testing, or for controlling an external system or device, among others.

In one embodiment, the loop structure may also include an output terminal, where the output terminal represents performance of a third function. In 1412, the loop structure, e.g., the output terminal of the loop structure, may invoke performance or execution of the third function. For example, the output of the node displayed in the loop structure (or the output of at least one of the nodes displayed in the loop structure) may be connected to the output terminal of the loop structure. Executing the graphical program may then include the node providing an output to the output terminal of the loop structure, and the output terminal of the loop structure performing the third function in response to receiving the output from the node. In various embodiments, the third function may perform any of a variety of operations related to the termination of the task. For example, the third function may be operable to perform at least one of: discontinue operation of the device, and perform clean-up operations related to the task, e.g., de-allocation of memory, release of system resources, etc., or other operations, as desired.

Thus, in one embodiment of the above method, the first function may create a program based on a received task specification, where the task specification specifies a task. The program may then execute to configure a device to perform at least a portion of the task, e.g., by performing the second function. The third function may then operate to discontinue operation of the device, and/or to perform clean-up operations related to the task. Thus, the loop structure may provide or invoke various functions to perform the specified task. Further examples of the use of the loop structure are provided below with reference to FIGS. 15A-15G.

It should be noted that in an exemplary embodiment of the invention, the graphical program may be operable to perform a measurement. In other words, the above-described method may operate as part of a measurement system. However, the method may also be applied to performing tasks in any other field as desired, including, but not limited to, manufacturing, testing, machine vision and control, science, medicine, engineering, robotics, finance, and business, among others.

FIGS. 15A-15G—Loop Structure

FIGS. 15A-15G illustrate various embodiments of a loop structure in a graphical program which may be operable to invoke a program for performing repetitive tasks. Various embodiments of the loop structure described herein may be suitable for use in a variety of measurement systems, as described above, but it is noted that the loop structure as described may also be suitable for use in any applications which perform iterative or repetitive tasks. The loop structure may be a primitive graphical program element provided by a graphical programming development environment for inclusion in the graphical program. As described above, in an exemplary embodiment, the graphical program may be a LabVIEW graphical program, but other types of graphical programs are also contemplated.

Various embodiments of the loop structure described below may perform similar functions as the repetitive task nodes described above with reference to FIGS. 13A-13F. However, whereas the node described above included implied looping functionality, various embodiments of the loop structure described below may include implied node functionality. In other words, the loop structure may perform certain functions described above with respect to various graphical program nodes. It should be noted that the examples of FIGS. 15A-15G are intended as exemplary embodiments of the invention, and are not intended to limit the invention to any particular appearance, form, structure, or architecture.

Figure 15A:
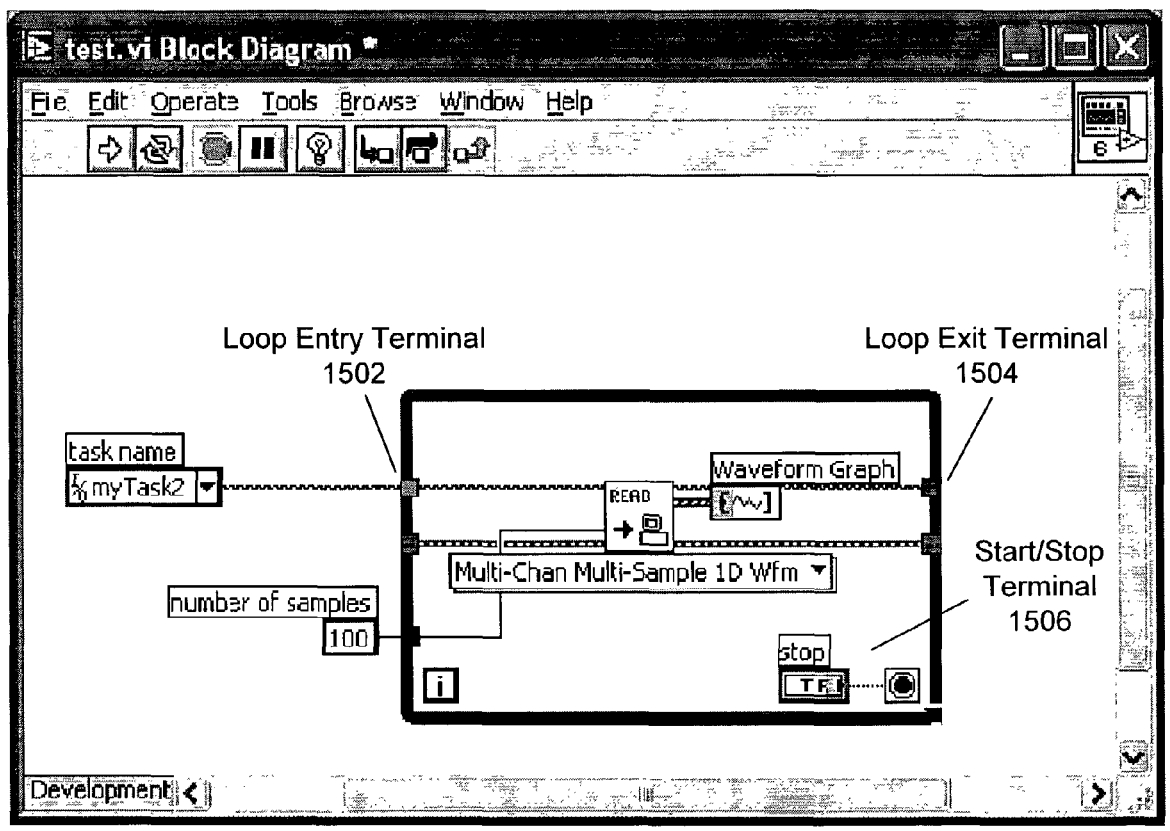
FIGS. 15A-15G illustrate various embodiments of a graphical program loop structure for performing repetitive tasks and/or generating a program to perform repetitive tasks.

FIG. 15A is a block diagram of a graphical program which includes a loop structure for performing a repetitive task, e.g., a repetitive measurement task. In one embodiment, the loop structure may be configured to receive a task specification 740 as input, where, as described above, the task specification 740 specifies the task. The loop structure may be executable in the graphical program to receive the task specification 740 as input, and invoke execution of a program to perform the task. The loop structure may indicate that the program is to iterate continuously, or a specified number of times, as specified by the task specification 740. In one embodiment, a node may be displayed in the graphical program which represents a repetitive task parameter, as was shown in FIGS. 13A-13F, described above. In this embodiment, the node may be connected to the loop structure to indicate that the program is to iterate repetitively in accordance with the repetitive task parameter, i.e., continuously, or a specified number of times.

In one embodiment, the loop structure may also be executable to generate the program based on the task specification 740. For example, similar to the node described above with reference to FIGS. 13A-13F, in generating the program, the loop structure may invoke an expert system 750 to analyze the task specification 740, and generate the program based on results of the expert system 750, where the program is operable to perform the task. In one embodiment, the expert system may analyze the task specification 740 and generate a run-time specification 770 for the task in response to the analyzing. The loop structure may also invoke the expert system 750 to validate the task specification 740 prior to generating the run-time specification 770. The loop structure may then invoke a run-time builder 780 to analyze the run-time specification 770 and generate a run-time 790 based on the run-time specification 770, where the run-time 790 may be executable to perform the task. Thus, the generated run-time 790 may comprise the program which executes to perform the specified task.

The loop structure may also invoke the run-time builder 780 to configure one or more devices according to the run-time specification 770. Thus, the loop structure may be executable to configure a device to perform the task. In this embodiment, the loop structure invoking execution of the program to perform the task may include invoking execution of the run-time 790 to perform the task. The run-time 790 (i.e., the program) may then execute to perform the task using the configured devices.

In one example, the task may include a measurement. The loop structure may configure the device to acquire data from a source, in which case the loop structure invoking execution of the program may include the device acquiring data from the source, and the loop structure acquiring the data from the device. In an embodiment where the graphical program operates in a system comprising a computer system 102 and the device 230, the loop structure acquiring data from the device 230 may include the loop structure acquiring data from the device 230 and providing the acquired data to the computer system 102, similar to the read node, described above.

As another example, the task may include a signal generation, in which case the loop structure may configure the device to generate signal data, and, by invoking execution of the program, may invoke signal generation by the device. If the graphical program operates in the system mentioned above, including a computer system and the device, the loop structure invoking signal generation by the device may include the loop structure acquiring data from the computer system and providing the acquired data to the device. The device may then generate the signal based on the acquired data. Thus, the task invoked or performed by the loop structure may comprise one or more measurements, and/or one or more signal generations, as specified by the task specification. Although the loop structure described herein has been presented for use in any of various applications, in an exemplary application of the present invention, the task may be a measurement task, where the task specification comprises a measurement task specification, and where the device comprises a measurement device. In other words, the loop structure described may be suited for performing measurements and/or signal generations in a computer based measurement system, among other applications.

As FIG. 15A also shows, in one embodiment, a node may be displayed inside the loop structure, where the loop structure indicates that the node is to execute repetitively or iteratively. In this embodiment, the loop structure invoking execution of the program to perform the task may include the loop structure invoking execution of the node, and the node invoking execution of the program to perform the task.

In one embodiment, the node may be executable to perform a portion of the task. For example, where the task includes a measurement, the node may be executable to acquire data from the device, i.e. may function as a read node. Thus, in this embodiment, the loop structure may be executable to configure the device to acquire data from a source, and invoking execution of the program may include the device acquiring data from the source, and the node acquiring data from the device. As described above, in a computer based system, the node may acquire data from the device and provide the acquired data to the computer system. In the case that the task includes signal generation, the loop structure may be executable to configure the device to generate signal data, and invoke signal generation by the device by retrieving data from the computer and writing data to the device. In other words, the node may function as a write node. Note that in other embodiments, other nodes besides read and write nodes are also contemplated, as described below.

In one embodiment, the loop structure may include a loop entry terminal 1502, as shown in FIG. 15A. The loop entry terminal 1502 may be operable to receive the task specification, invoke an expert system to analyze the task specification and generate a run-time specification for the task, and invoke a run-time builder to analyze the run-time specification and generate a run-time based on the run-time specification. As mentioned above, the run-time may then be executable to perform the task. Additionally, when the task is a repetitive task, the loop structure invoking execution of a program to perform the task may include the loop structure invoking two or more iteration cycles of the program to perform the task. In this case, the loop entry terminal 1502, i.e., the loop structure, may be further operable to perform one or more operations prior to or during a first iteration cycle of the two or more iteration cycles of the program, such as initialization of data structures, or special operations related to boundary conditions, as described above with reference to FIGS. 13A-13F. Thus, in one embodiment, the loop entry terminal 1502 may operate in a similar manner as the repetitive task nodes (e.g., the "play" node) described above. In one embodiment, the loop entry terminal may execute to configure the device to acquire data from a source, and/or to generate signal data, as described above.

The loop structure may also include a loop exit terminal 1504, also referred to as an output terminal, which may operate to terminate the repetitive task, similar to the "stop" node described above. In other words, the loop exit terminal 1504 may operate to terminate the specified task, e.g., data acquisition by the measurement device, upon fulfillment of stopping conditions or user input. Where the loop structure invokes two or more iteration cycles of the program to perform the task, the loop exit terminal 1504 may be further operable to perform one or more operations during or after a final iteration cycle of the two or more iteration cycles of the program, such as various "clean up" operations, as also described above.

Figure 15B:
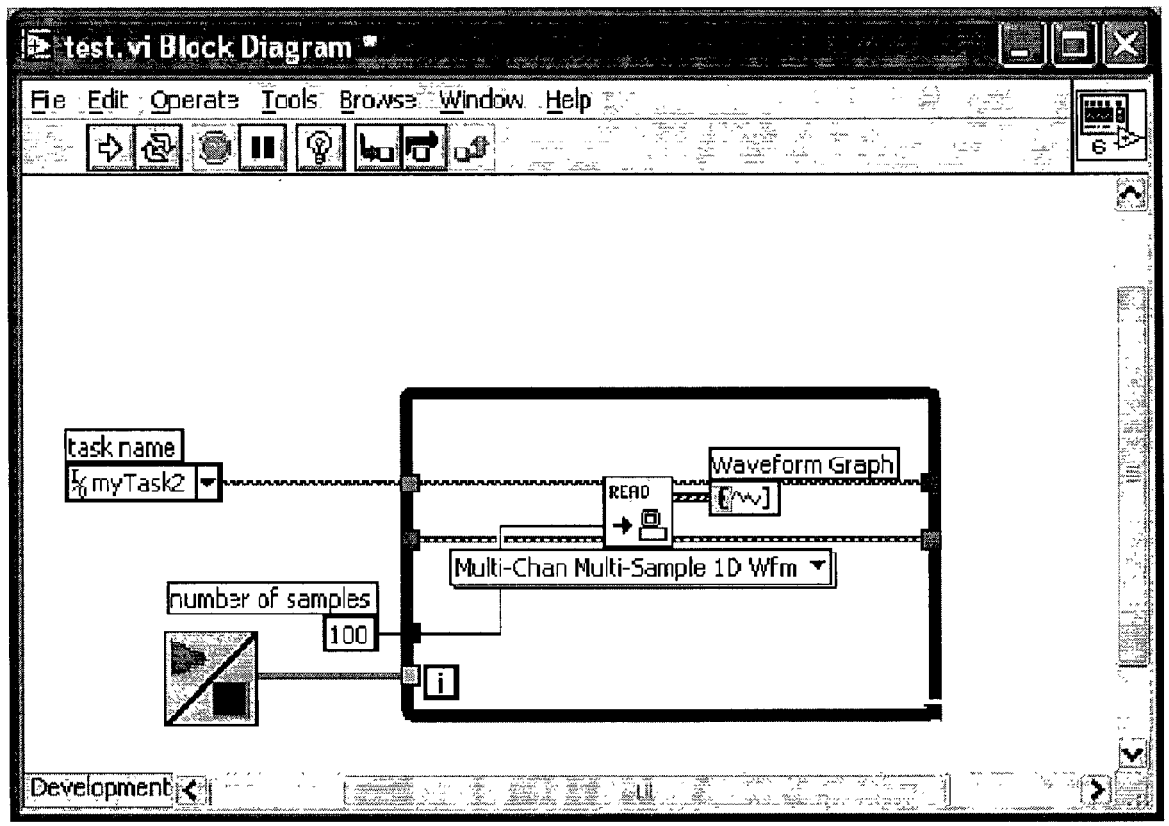

FIG. 15B is similar to the graphical program of FIG. 15A, but rather than using a start/stop terminal 1506 to initiate and terminate the task, a GUI element may be displayed which is operable to control operation of the graphical program, as described above with reference to FIG. 13B. In one embodiment, the GUI element may be displayed in the graphical program. For example, as FIG. 15B shows, in one embodiment, the GUI element may comprise a start/stop node which is connected to the loop structure as shown, and which may be operable to initiate and terminate execution of the task and/or the graphical program. For example, the GUI element may be operable to receive user input to invoke execution of the graphical program. Then, the GUI element may be operable to receive further user input to terminate execution of the graphical program. In one embodiment, the GUI element may be a toggle switch which operates to alternately control start and stop operations of the graphical program and/or task.

Figure 15C:
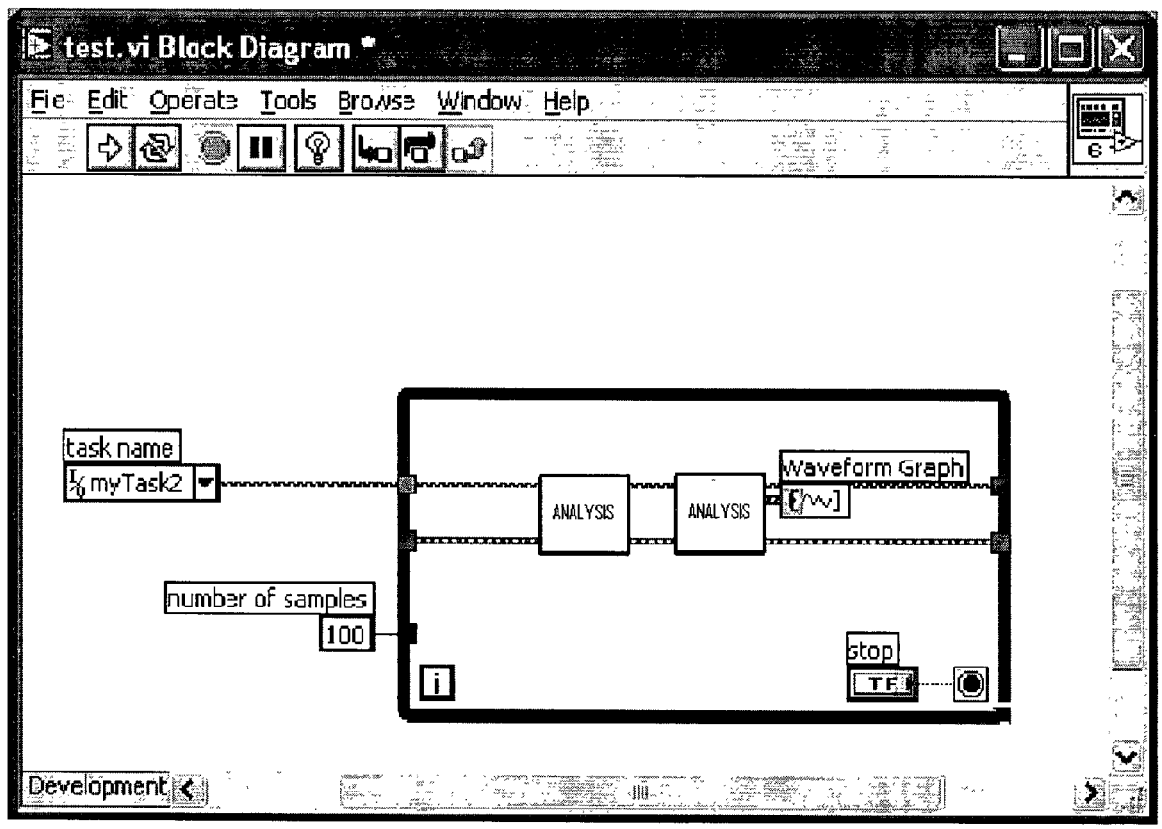
Figure 15D:
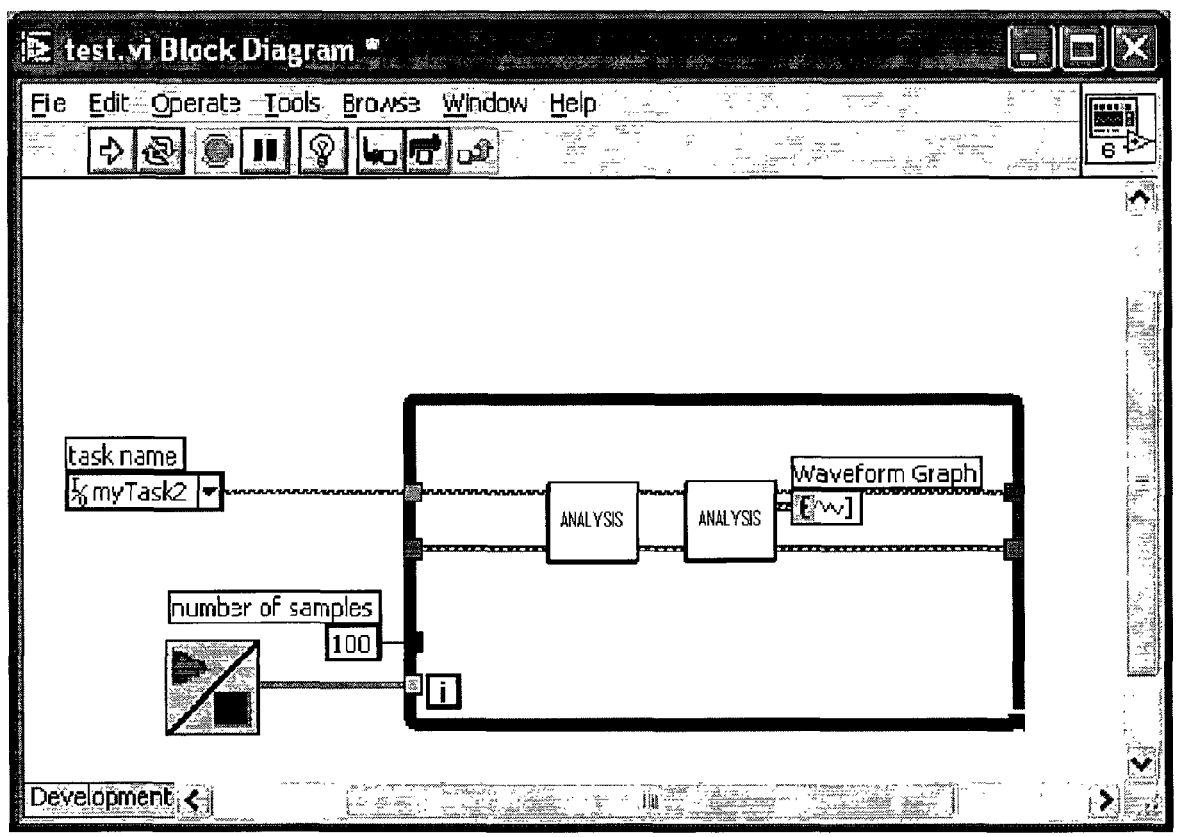

Turning now to FIG. 15C, in one embodiment, the graphical program may include one or more nodes displayed inside the loop structure, where the loop structure indicates that the one or more nodes are to execute repetitively. The nodes may be executable to perform one or more analysis functions of the task, as indicated by FIGS. 15C and 15D. In this example, the loop structure includes implied "read node" functionality, i.e., the loop structure operates to retrieve acquired data from a measurement device. The loop structure may provide the acquired data to the analysis node(s) for performing one or more analysis functions on the acquired data, then send the results and/or the acquired data to the computer system. It should be noted than in other embodiments, the one or more nodes displayed inside the loop structure may provide various other functions. For example, digital or analog signal processing nodes may operate on the acquired data. As another example, a communication node may route data, analysis results, or alarms to an external system, such as a control system or a website. Thus, any of a variety of nodes may be included inside the loop structure, as desired.

Figure 15E:
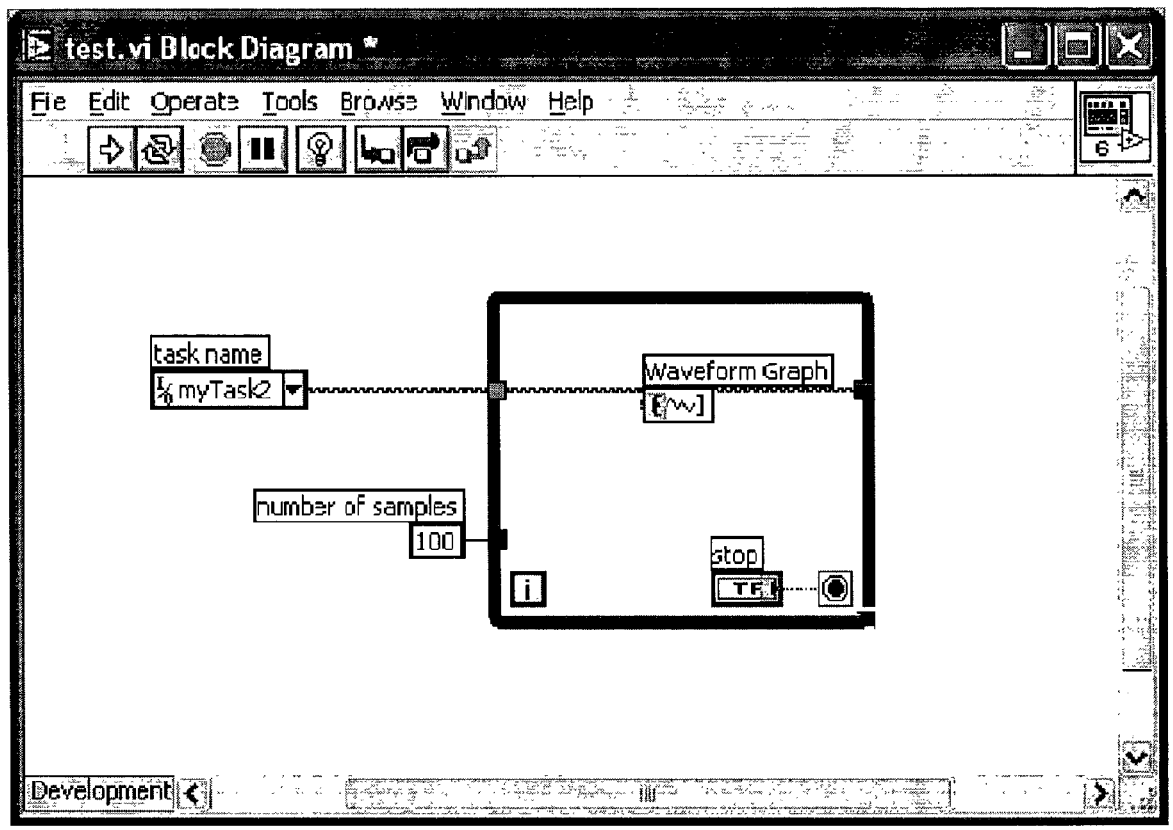
Figure 15F:
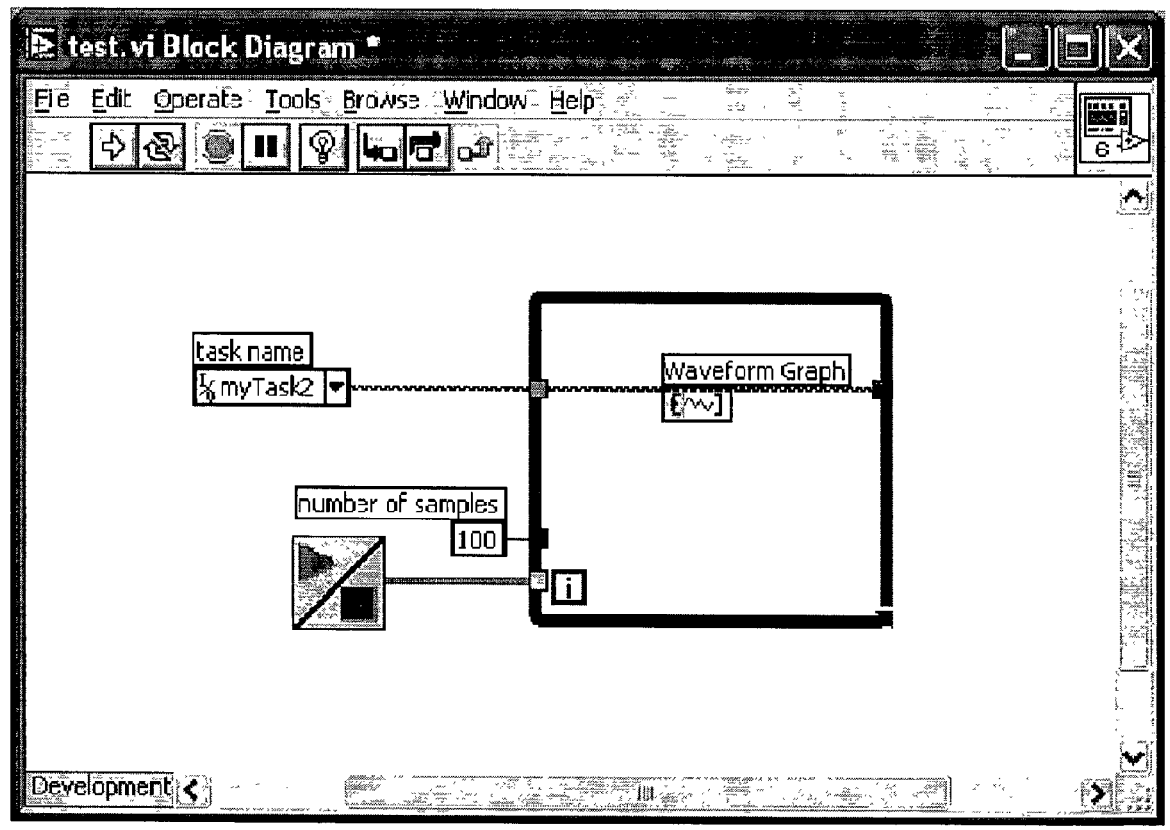

In another embodiment, the loop structure may not contain any nodes, as indicated by FIGS. 15E and 15F. In other words, the loop structure may itself perform some or all of the functionality described above with reference to various graphical program nodes.

As mentioned above, in one embodiment, the loop structure may include a loop entry terminal, also referred to as an input terminal, which is operable to receive the task specification. In particular, the loop entry terminal may be connected to an output terminal of a node in the graphical program which may provide the task specification to the loop structure. For example, the node may be a task specification node, as illustrated in FIGS. 15A-15F, and described above.

Figure 15G:
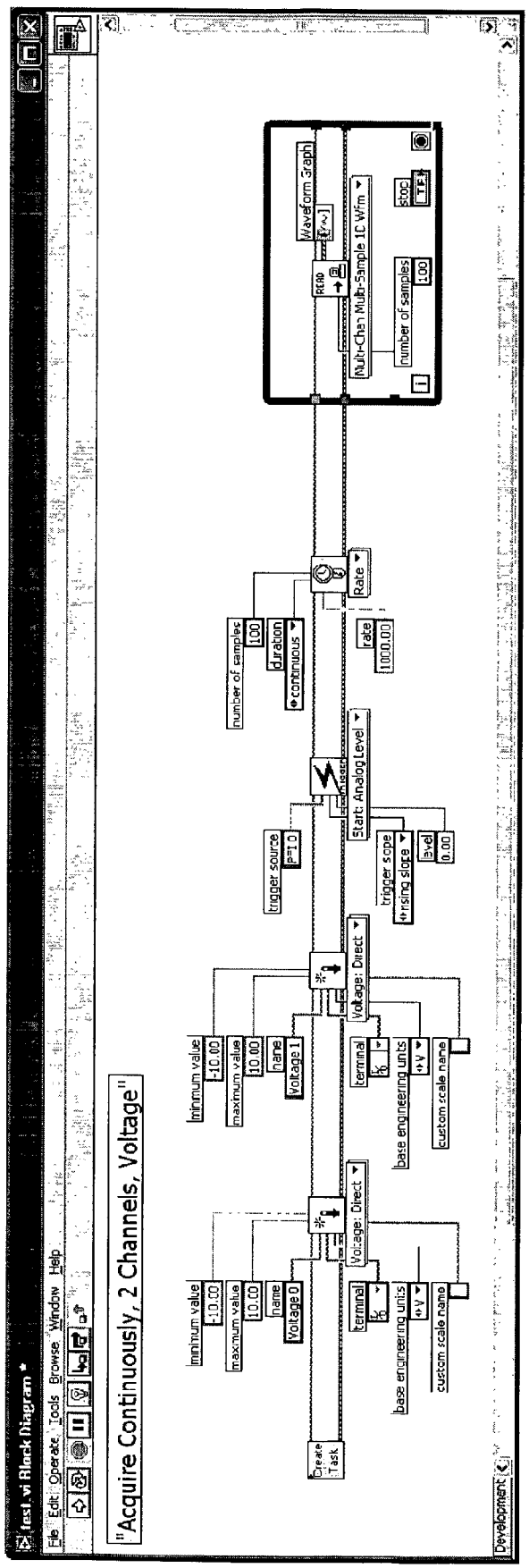

In other embodiments, the node may be a configuration node which operates to configure the task specification for input to the loop structure, as shown in FIG. 15G. In other words, the configuration node may operate in conjunction with one or more other configuration nodes to generate the task specification. For example, as FIG. 15G shows, each configuration node may comprises one of: a channel configuration node, operable to add channel configuration information to the task specification, a timing configuration node, operable to add timing configuration information to the task specification, and a triggering configuration node, operable to add triggering configuration information to the task specification. In other embodiments, other types of configuration nodes are also contemplated. Thus, as FIG. 15G indicates, one or more configuration nodes may operate to configure or "fill" a task specification, e.g., a measurement task specification, with configuration information, e.g., derived from user input, and to provide the task specification to the loop structure.

As also described above with reference to FIGS. 13A-13E, in various embodiments, the graphical program may include a GUI element which may be operable to control operation of the graphical program. In particular, the GUI element may operate to control start and/or stop operations of the task performed by the graphical program, as described above in detail. Two exemplary embodiments of the GUI element are presented for each of the graphical programs illustrated in FIGS. 15A-15F. More specifically, embodiments where the GUI element is a "start/stop" terminal 1506 are illustrated in FIGS. 15A, 15C, 15E, and 15G, while embodiments where the GUI element is a "start/stop" node included in the graphical program are illustrated in FIGS. 15B, 15D, and 15F. It should be noted than in another embodiment, the start/stop terminal 1506 may be implied, i.e., a start/stop control may be provided on a separate panel, but a corresponding terminal may not be displayed in the graphical program.

Finally, as also described above, in one embodiment, the graphical program may be operable to receive user input selecting the loop structure, and display a more detailed graphical program representing operations of the loop structure. In other words, various of the functions performed by the loop structure which are implicit in the loop structure, i.e., which are not represented graphically, may be explicated by selection and/or activation of the loop structure icon in the graphical program. For example, in an embodiment where the loop structure implicitly includes read or write node functionality, double-clicking on the loop structure icon may result in the graphical program displaying the corresponding read or write node inside the loop structure. Similarly, implied analysis node functionality may be explicitly represented by a displayed analysis node or nodes upon selection of the loop structure icon.

Thus, in various embodiments of the present invention, a loop structure may be operable to receive a task specification and to invoke execution of a program to perform a specified task based on the received task specification. Additionally, the loop structure may be operable to generate the program as well, such as by invoking an expert system and run-time builder, as described in detail above. Finally, the loop structure may be operable to provide various functions for performing the specified task, including one or more of read and/or write operations, start/stop operations, analysis, communication, and signal processing, among others.

It should be noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the system and method of the present invention have been described in connection with several embodiments, the invention is not intended to be limited to the specific forms set forth herein, but on the contrary, it is intended to cover such alternatives, modifications, and equivalents as may be reasonably included within the spirit and scope of the invention as defined by the appended claims.

We claim:

1. A non-transitory computer accessible memory medium that stores program instructions for creating a graphical program that performs a task, wherein the program instructions are executable by a processor to perform:
displaying a node in a graphical program, wherein the graphical program comprises a plurality of interconnected nodes that visually indicate functionality of the graphical program, wherein the graphical program is executable to perform the functionality;
configuring the node to receive a task specification; and
executing the node in the graphical program, wherein said executing the node comprises:
the node receiving a task specification as input, wherein the task specification specifies a task;
the node generating a program which is configured to perform the task, wherein the node generates the program based on the task specification; and
the node invoking execution of the program to perform the task.

2. The non-transitory computer accessible memory medium of claim 1,
wherein the node generating the program comprises:
the node invoking an expert system to analyze the task specification; and
the node generating the program based on results of the expert system, wherein the program is configured to perform the task.

3. The non-transitory computer accessible memory medium of claim 1,
wherein the node generating the program comprises:
the node invoking an expert system to analyze the task specification and generate a run-time specification for the task in response to said analyzing; and
the node invoking a run-time builder to analyze the run-time specification and generate a run-time based on the run-time specification, wherein the run-time is executable to perform the task.

4. The non-transitory computer accessible memory medium of claim 3, wherein the program instructions are further executable to perform:
the expert system validating the task specification prior to generating the run-time specification.

5. The non-transitory computer accessible memory medium of claim 3, wherein the program instructions are further executable to perform:
the run-time builder configuring one or more devices according to the run-time specification, wherein the run-time executes to perform the task using the configured one or more devices.

6. The non-transitory computer accessible memory medium of claim 3,
wherein the node invoking execution of the program to perform the task comprises the node invoking execution of the run-time to perform the task.

7. The non-transitory computer accessible memory medium of claim 1, wherein the program instructions are further executable to perform:
displaying a graphical user interface (GUI) for specifying the task;
receiving user input to the GUI indicating a plurality of parameters characterizing the task, wherein the plurality of parameters is useable in generating the task specification; and
generating the task specification.

8. The non-transitory computer accessible memory medium of claim 1,
wherein said configuring the node to receive a task specification comprises connecting an input terminal of the node to an output terminal of a different node in the graphical program.

9. The non-transitory computer accessible memory medium of claim 8,
wherein the different node is a configuration node which operates to configure the task specification for input to the node.

10. The non-transitory computer accessible memory medium of claim 9, wherein the configuration node comprises one of:
a channel configuration node, which is configured to add channel configuration information to the task specification;
a timing configuration node, which is configured to add timing configuration information to the task specification; or
a triggering configuration node, which is configured to add triggering configuration information to the task specification.

11. The non-transitory computer accessible memory medium of claim 1,
wherein the node is a primitive node provided by a graphical programming development environment for inclusion in the graphical program.

12. The non-transitory computer accessible memory medium of claim 1,
wherein the task comprises a repetitive task,
wherein the node invoking execution of a program to perform the task comprises:
the node invoking two or more iteration cycles of the program to perform the task; and the node performing one or more operations during or prior to a first iteration cycle of the two or more iteration cycles of the program.

13. The non-transitory computer accessible memory medium of claim 1, wherein the node is configured to be connected to one or more of:
   a read node, which is configured to acquire data from a device, wherein the task comprises a measurement; or
   a write node, which is configured to write data to a device, wherein the task comprises a signal generation.

14. The non-transitory computer accessible memory medium of claim 13, wherein the task comprises a repetitive task, wherein the program instructions are further executable to perform:
   displaying a stop node in the graphical program, wherein the stop node is connected to the one or more of the read node and the write node, and wherein the stop node is configured to terminate the task.

15. The non-transitory computer accessible memory medium of claim 14, wherein the node invoking execution of the program to perform the task comprises:
   the node invoking two or more iteration cycles of the program to perform the task; and
   the stop node performing one or more operations prior to or during a final iteration cycle of the two or more iteration cycles of the program.

16. The non-transitory computer accessible memory medium of claim 13, wherein the program instructions are further executable to perform:
   displaying a stop node in the graphical program, wherein the stop node is connected to the one or more of the read node and the write node, and wherein the stop node is configured to terminate the task.

17. The non-transitory computer accessible memory medium of claim 1, wherein the task specification comprises a measurement task specification, and wherein the task comprises a measurement task.

18. The non-transitory computer accessible memory medium of claim 1, wherein the task comprises a measurement, wherein the program instructions are further executable to perform:
   the node executing to configure a device to acquire data from a source;
   wherein the node invoking execution of a program to perform the task comprises:
      the device acquiring data from the source; and
      the node acquiring data from the device.

19. The non-transitory computer accessible memory medium of claim 18,
   wherein the program instructions implement a portion of a system comprising a computer system and the device; and
   wherein the node acquiring data from the device comprises the node acquiring data from the device and providing the acquired data to the computer system.

20. The non-transitory computer accessible memory medium of claim 1, wherein the task comprises a signal generation, wherein the program instructions are further executable to perform:
   the node executing to configure a device to perform a signal generation;
   wherein the node invoking execution of a program to perform the task comprises:
      the node invoking signal generation by the device; and
      the device generating a signal in response to the invocation.

21. The non-transitory computer accessible memory medium of claim 20,
   wherein the program instructions implement a portion of a system comprising a computer system and the device; and
   wherein the node invoking signal generation by the device comprises the node acquiring data from the computer system and providing the acquired data to the device.

22. The non-transitory computer accessible memory medium of claim 1,
   wherein the graphical program is a data flow graphical program.

23. The non-transitory computer accessible memory medium of claim 1, wherein the task comprises a complex operation using one or more hardware devices.

24. The non-transitory computer accessible memory medium of claim 1,
   wherein the task specification comprises configuration information for one or more devices; and
   wherein, after being configured with the configuration information, the one or more devices are configured to perform the task.

25. The non-transitory computer accessible memory medium of claim 1, wherein the task comprises a repetitive task, wherein the program instructions are further executable to:
   configure the node to perform the repetitive task.

26. The non-transitory computer accessible memory medium of claim 25,
   wherein said configuring the node to perform the repetitive task comprises displaying the node in a loop structure in the graphical program, wherein the loop structure indicates that the node is to execute continuously or a specified number of times.

27. The non-transitory computer accessible memory medium of claim 25,
   wherein said configuring the node to perform the repetitive task comprises:
      displaying a different node in the graphical program which represents a repetitive task parameter, wherein the repetitive task parameter indicates that the node is to execute at least one of 1) continuously or 2) a specified number of times; and
      connecting the node to the different node to indicate that the node is to execute repetitively in accordance with the repetitive task parameter.

28. The non-transitory computer accessible memory medium of claim 1, wherein the program instructions are further executable to perform:
   receiving user input selecting the node; and
   displaying a more detailed graphical program representing operations of the node.

29. A method for creating a graphical program that performs a task, the method comprising:
   utilizing a computer to perform:
      displaying a node in a graphical program, wherein the graphical program comprises a plurality of interconnected nodes that visually indicate functionality of the graphical program;
      configuring the node to receive a task specification; and
      executing the node in the graphical program, wherein said executing the node comprises:
         the node receiving a task specification as input, wherein the task specification specifies a task;
         the node generating a program which is configured to perform the task, wherein the node generates the program based on the task specification; and the node invoking execution of the program to perform the task.

30. The method of claim 29, wherein the node generating the program comprises:
the node invoking an expert system to analyze the task specification; and
the node generating the program based on results of the expert system, wherein the program is configured to perform the task.

31. The method claim 29, wherein the node generating the program comprises:
the node invoking an expert system to analyze the task specification and generate a run-time specification for the task in response to said analyzing; and
the node invoking a run-time builder to analyze the run-time specification and generate a run-time based on the run-time specification, wherein the run-time is executable to perform the task.

32. The method of claim 29, wherein the task specification comprises a measurement task specification, and wherein the task comprises a measurement task.

33. A system, comprising:
a processor; and
a memory medium coupled to the processor;
wherein the memory medium stores program instructions executable by the processor to:
display a node in a graphical program, wherein the graphical program comprises a plurality of interconnected nodes that visually indicate functionality of the graphical program;
configure the node to receive a task specification; and
execute the node in the graphical program, wherein the node executes to:
receive a task specification as input, wherein the task specification specifies a task;
generate a program which is configured to perform the task, wherein the node generates the program based on the task specification and invoke execution of the program to perform the task.

34. The system of claim 33, wherein, in generating the program, the node is executable to:
invoke an expert system to analyze the task specification; and
generate the program based on results of the expert system, wherein the program is configured to perform the task.

35. The system of claim 29, wherein, in generating the program, the node is executable to:
invoke an expert system to analyze the task specification and generate a run-time specification for the task in response to said analyzing; and
invoke a run-time builder to analyze the run-time specification and generate a run-time based on the run-time specification, wherein the run-time is executable to perform the task.

36. The system of claim 29, wherein the task specification comprises a measurement task specification, and wherein the task comprises a measurement task.

37. A non-transitory computer accessible memory medium that stores program instructions, wherein the program instructions are executable by a processor to implement:
a node in a graphical program, wherein the graphical program comprises a plurality of interconnected nodes that visually indicate functionality of the graphical program;
wherein the node is configurable to receive a task specification as input, wherein the task specification specifies a task; and
wherein the node is executable in the graphical program to:
receive the task specification as input; and
invoke an expert system to analyze the task specification; and
generate a program based on results of the expert system, wherein the program is configured to perform the task.

* * * * *

UNITED STATES PATENT AND TRADEMARK OFFICE
CERTIFICATE OF CORRECTION

Page 1 of 1

PATENT NO. : 7,969,431 B2
APPLICATION NO. : 10/194476
DATED : June 28, 2011
INVENTOR(S) : Thomas A. Makowski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2601 days.

Signed and Sealed this
Eighteenth Day of October, 2011

David J. Kappos
*Director of the United States Patent and Trademark Office*